United States Patent [19]
Amberg et al.

[11] 3,969,173
[45] July 13, 1976

[54] METHOD AND APPARATUS FOR FABRICATING THERMOPLASTIC CONTAINERS

[75] Inventors: Stephen W. Amberg, Toledo, Ohio; Ralph G. Amberg, Monticello, Ind.

[73] Assignee: Owens-Illinois, Inc., Toledo, Ohio

[22] Filed: Nov. 23, 1973

[21] Appl. No.: 418,562

[52] U.S. Cl. .................................. 156/218; 53/33; 93/36.05; 93/94 R; 156/187; 156/203; 156/256; 156/266; 156/306; 156/322; 156/450; 156/466; 156/86; 228/8; 228/123; 264/160; 264/299; 264/319
[51] Int. Cl.² ........................................ B29D 23/10
[58] Field of Search ............... 156/85, 86, 203, 218, 156/446, 447, 450, 466, 184, 189, 194, 256, 264, 266, 306, 322; 53/13, 32, 33; 93/36.05, 94 FC; 226/8, 123, 153; 264/96, 157, 160, 299, 319

[56] References Cited
UNITED STATES PATENTS

| | | | |
|---|---|---|---|
| 648,930 | 5/1900 | Doughty | 156/203 |
| 1,810,585 | 6/1931 | Young | 156/203 |
| 2,631,509 | 3/1953 | Whytlan | 156/203 |
| 3,056,339 | 10/1962 | Sommerfeld et al. | 156/203 |
| 3,094,925 | 6/1963 | Huber | 226/153 |
| 3,207,651 | 9/1965 | Hoyd et al. | 156/203 |
| 3,376,181 | 4/1968 | Larson et al. | 156/203 |
| 3,380,229 | 4/1968 | Nelson | 53/375 |
| 3,562,920 | 2/1971 | Vuilleumier et al. | 34/48 |
| 3,767,496 | 10/1973 | Amberg et al. | 156/86 |

Primary Examiner—Edward G. Whitby
Attorney, Agent, or Firm—Dressler, Goldsmith, Clement & Gordon, Ltd.

[57] ABSTRACT

A cup or other container is fabricated from two continuous web stocks. The sidewall, which is formed from a rectangular sheet-like blank of thermoplastic material cut from one web, is produced by winding the blank in a cylindrical winding mechanism to present the edges in overlapping relationship, heating the edges as the cylindrical blank is transferred axially in the winding mechanism, and compressing the edges between seaming rollers to join the edges into a liquid-tight seam. The cylindrical sleeve is placed on an upward-facing forming mandrel carried on a conveyor. A bottom disc closure is partially cut from a second web, transferred by the web into overlying relationship with the path of the forming mandrels, punched from the web, and deposited on the top of the forming mandrel preparatory to reception of the cylindrical sleeve. The cylindrical sleeves are shrunken about the forming mandrels to cause them to assume the shape thereof. The disc is joined to the shrunken sleeve to provide a liquid-tight seam at the bottom of the container. A rim is formed at the opposite end of the container by reciprocating die mechanisms which cooperate with the forming mandrels to finish the containers while on the forming mandrels.

19 Claims, 19 Drawing Figures

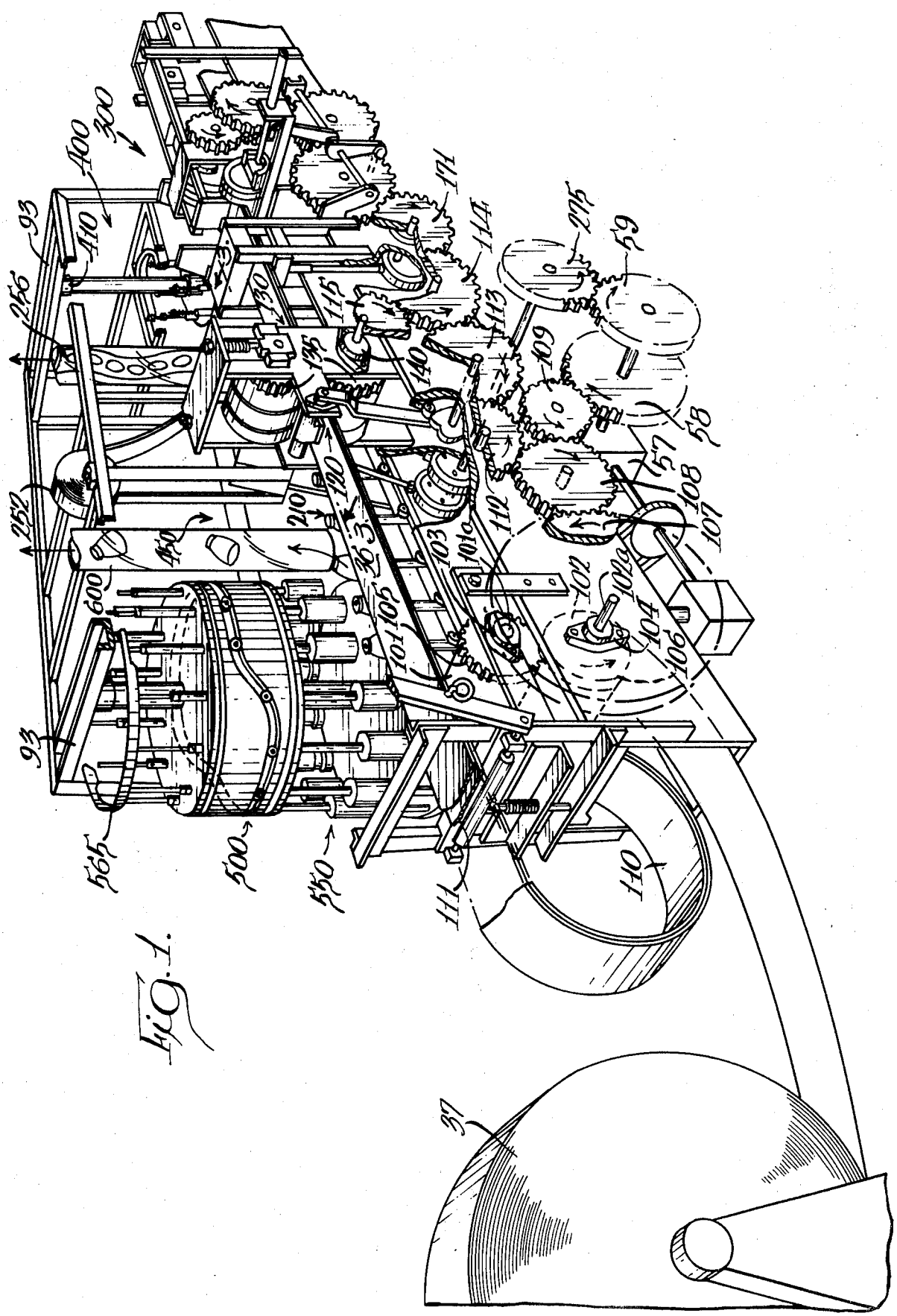

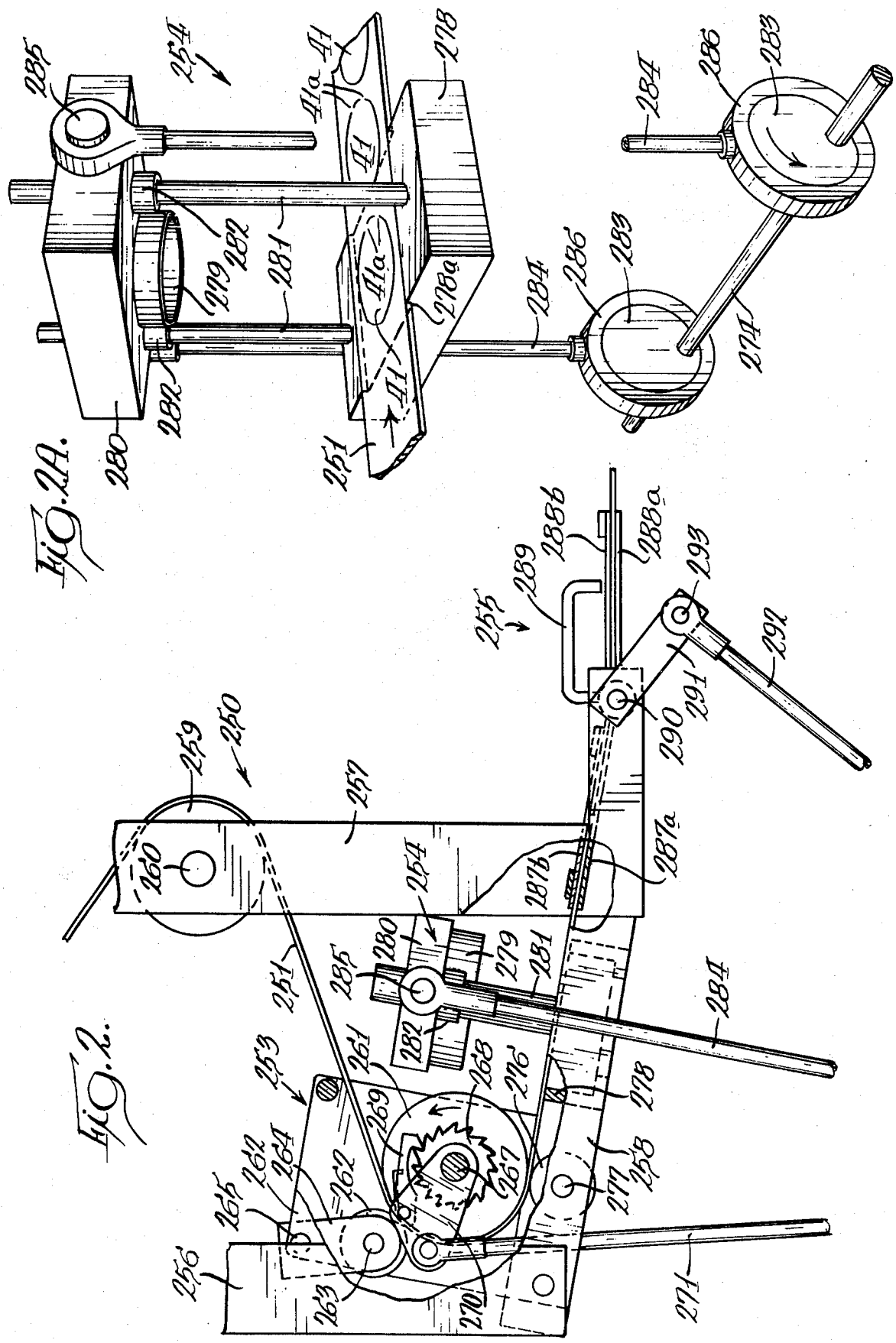

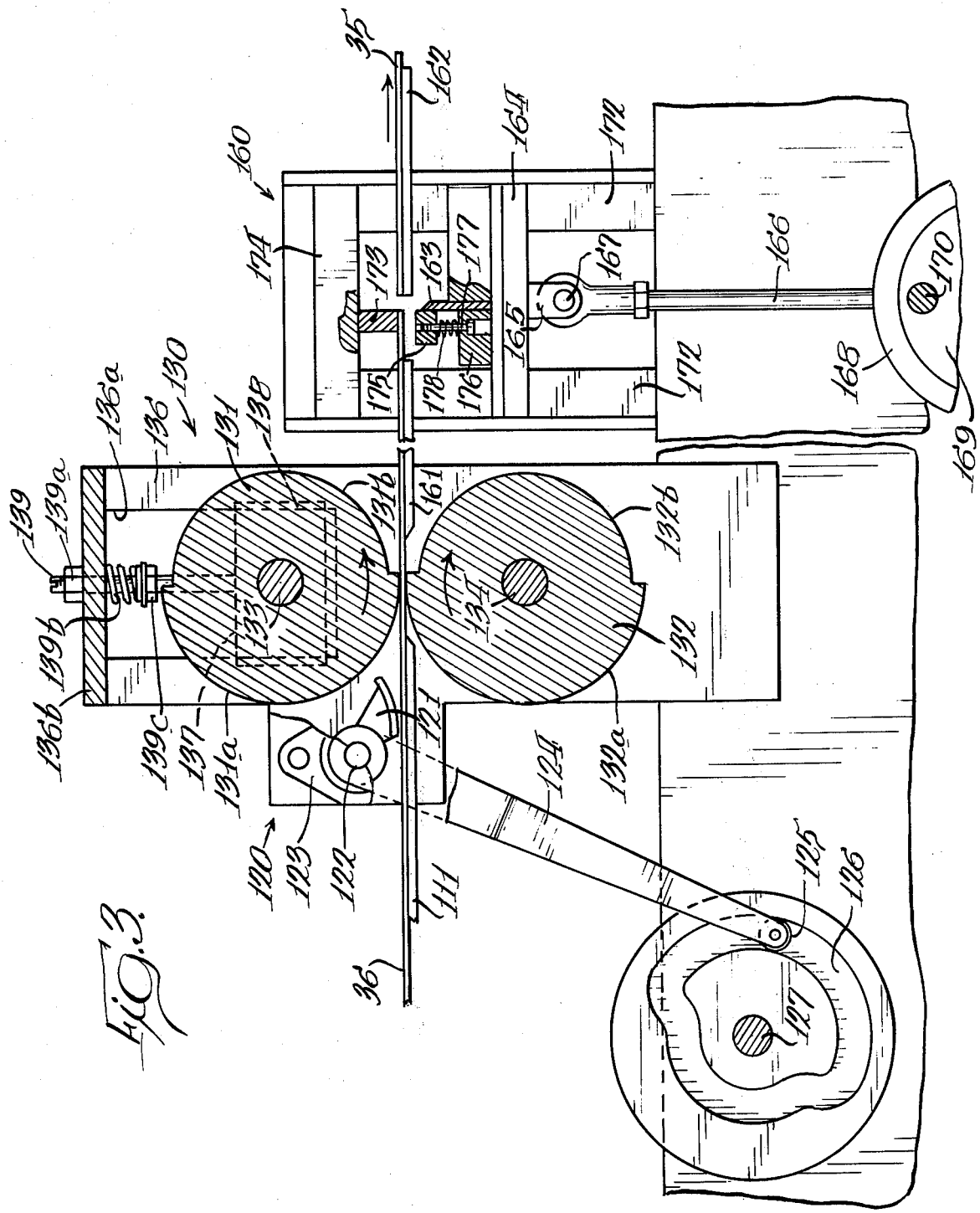

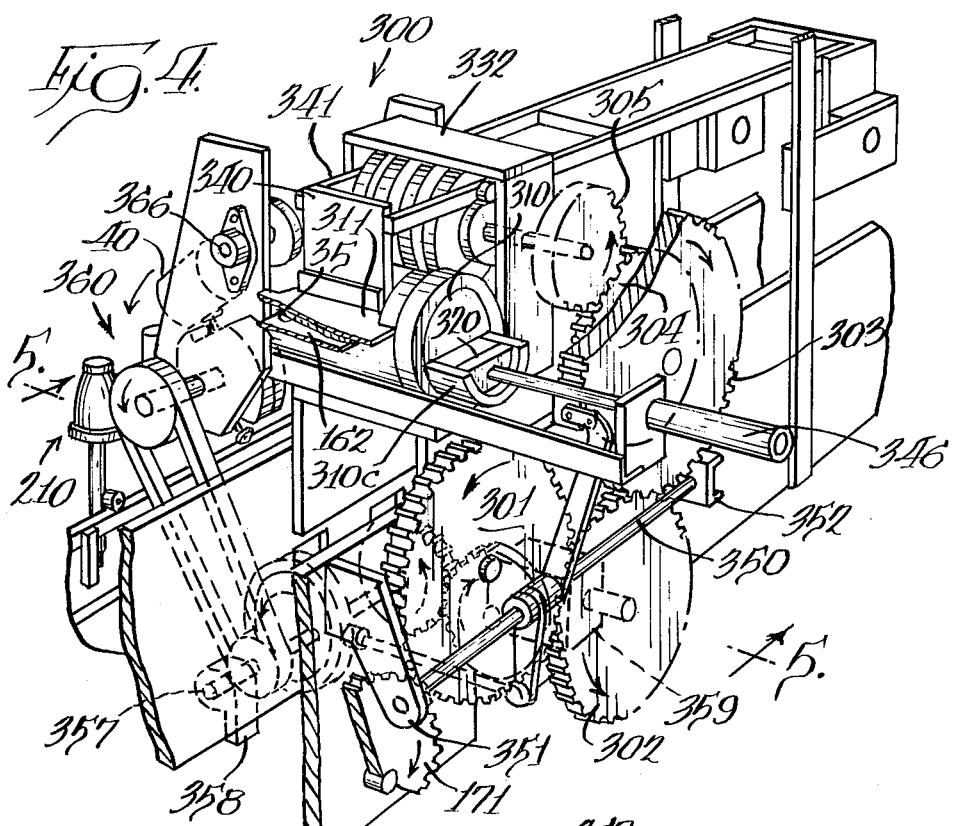
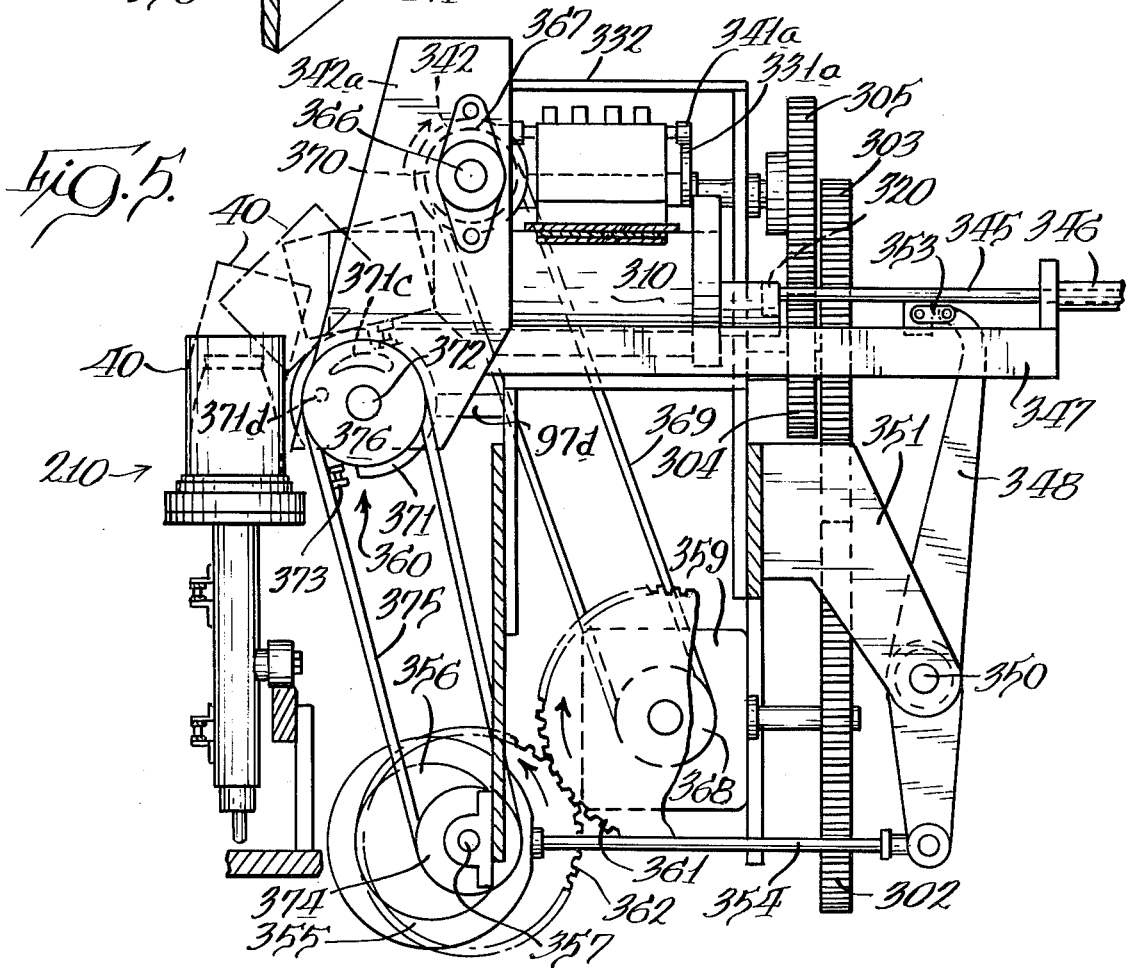

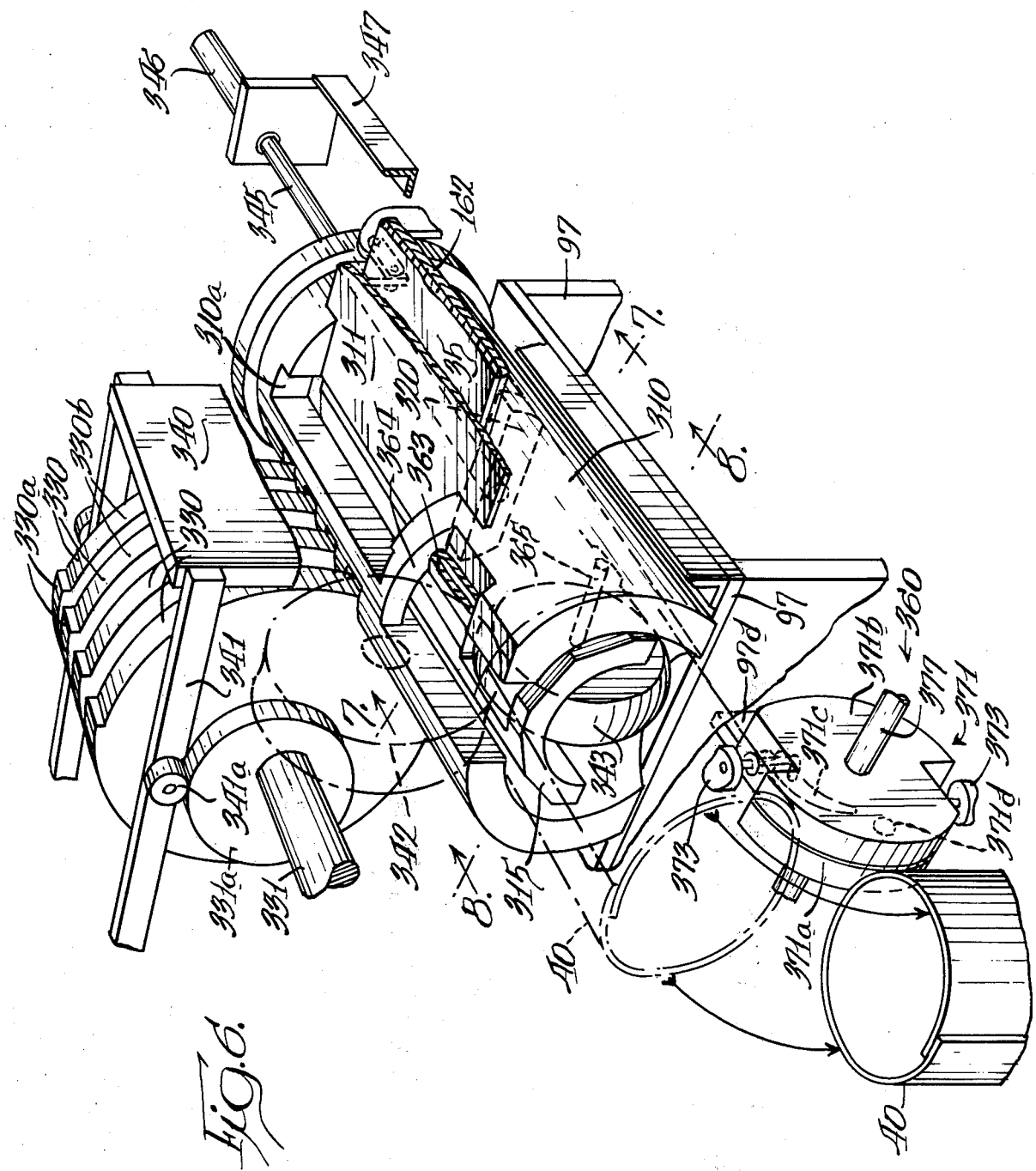

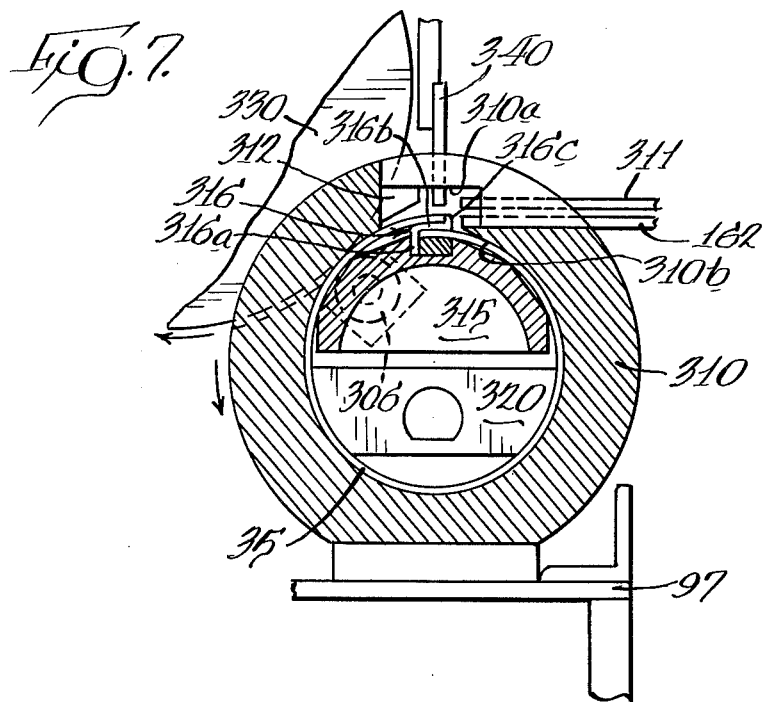
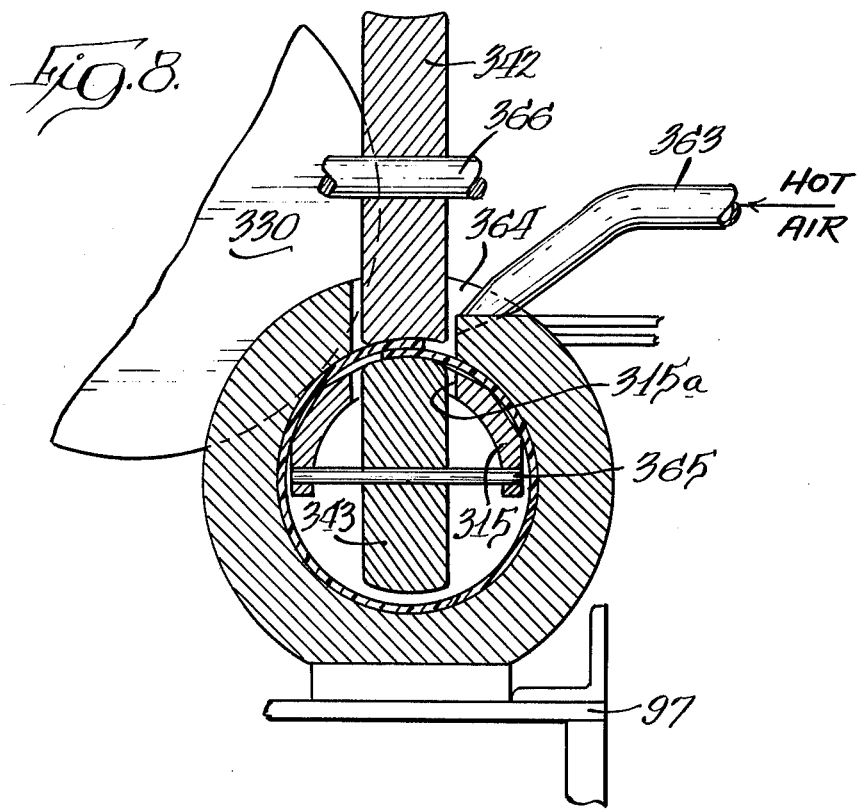

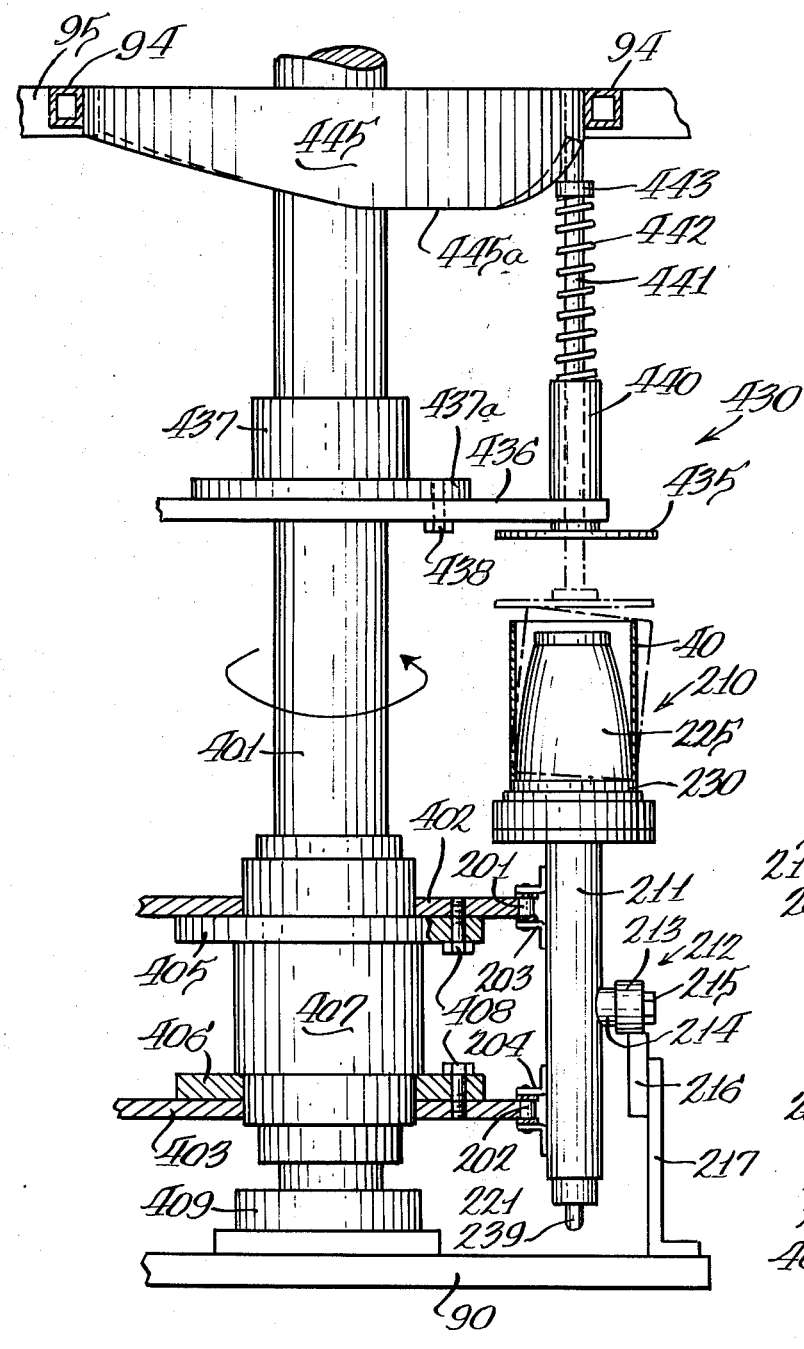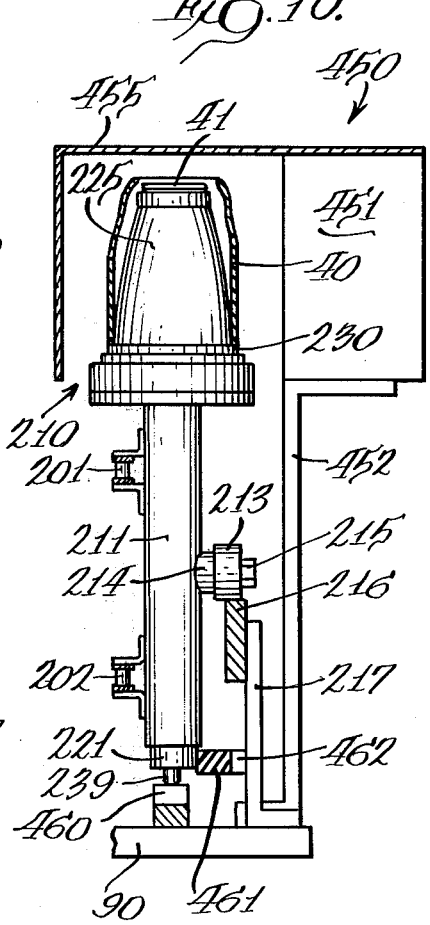

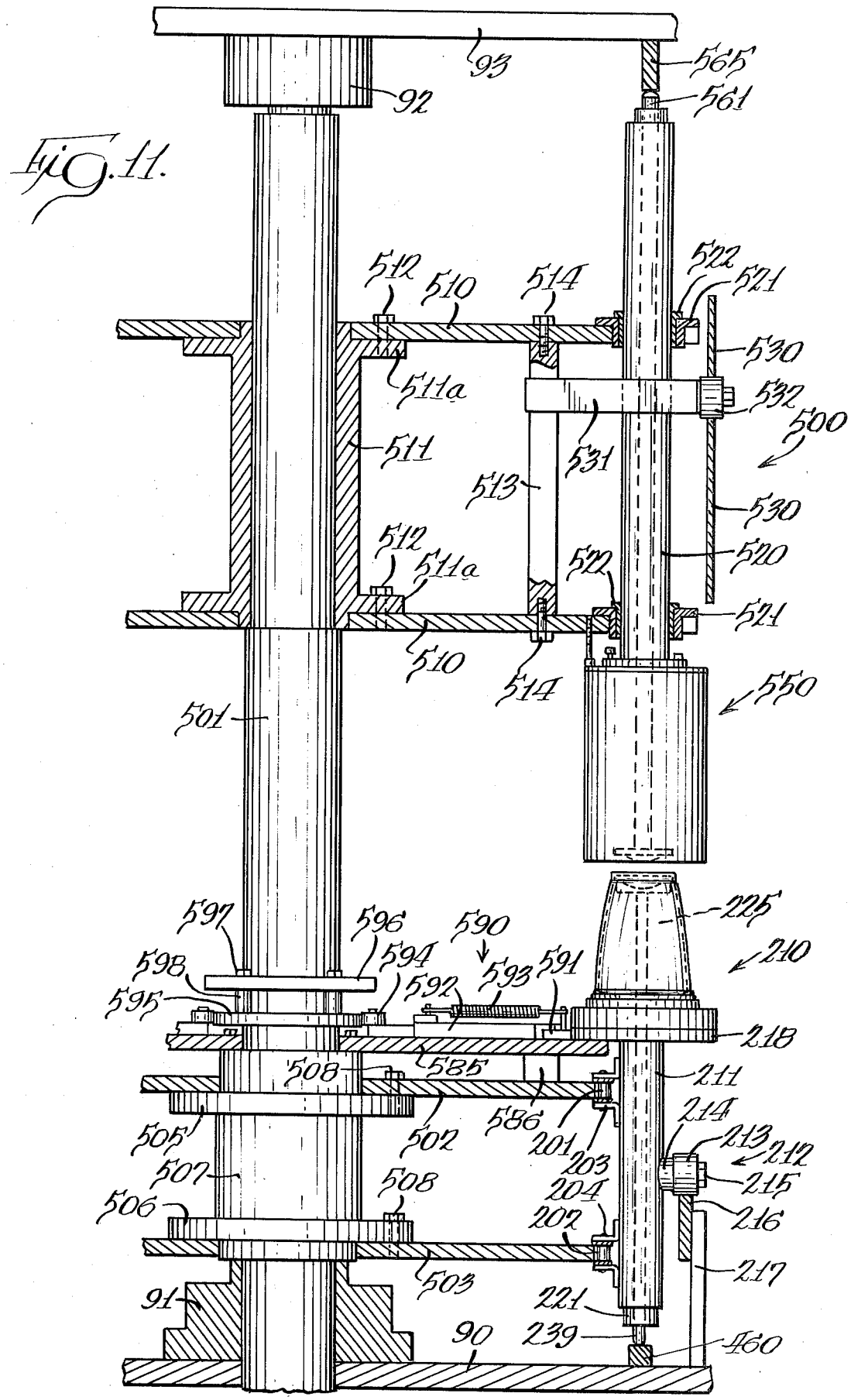

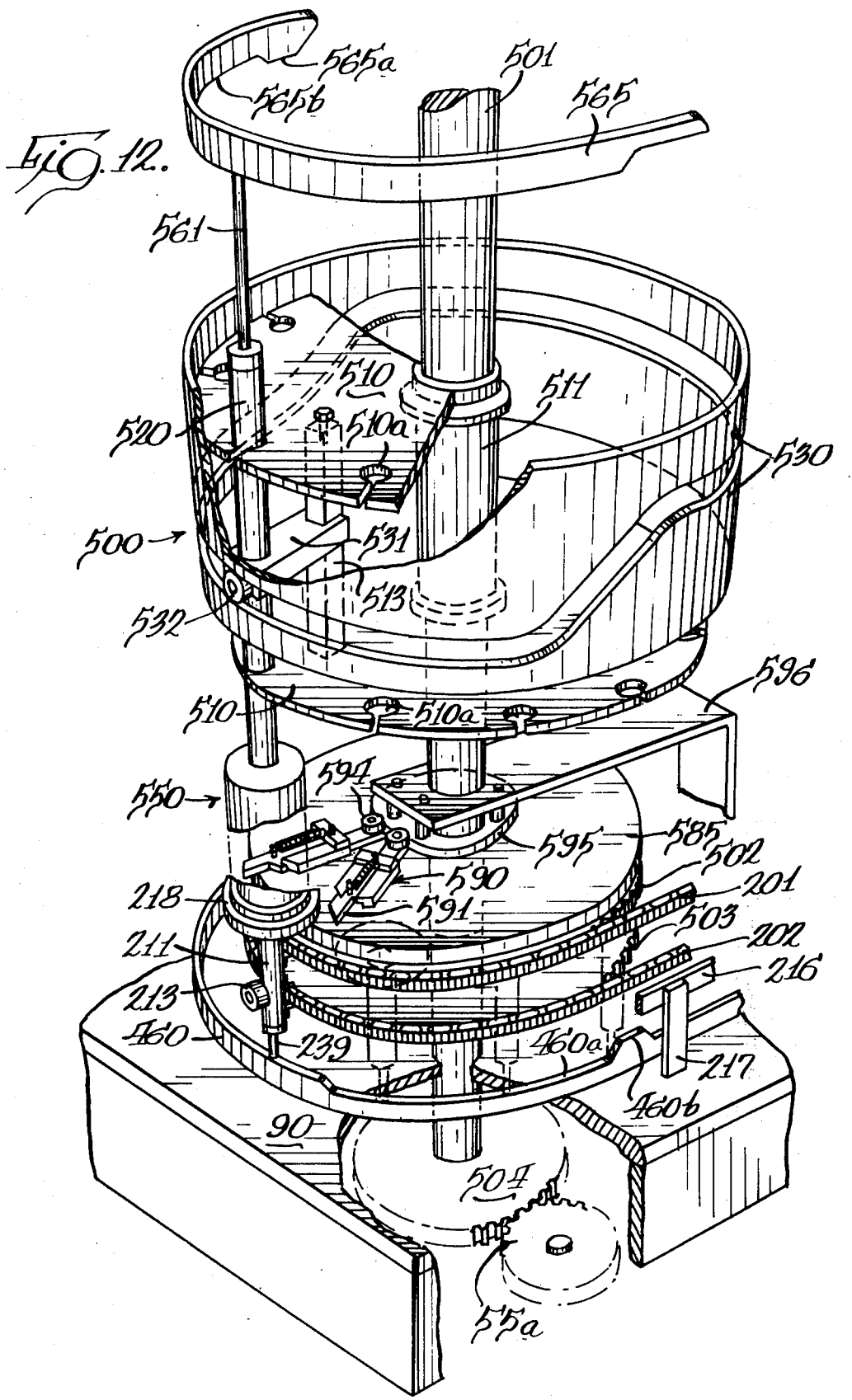

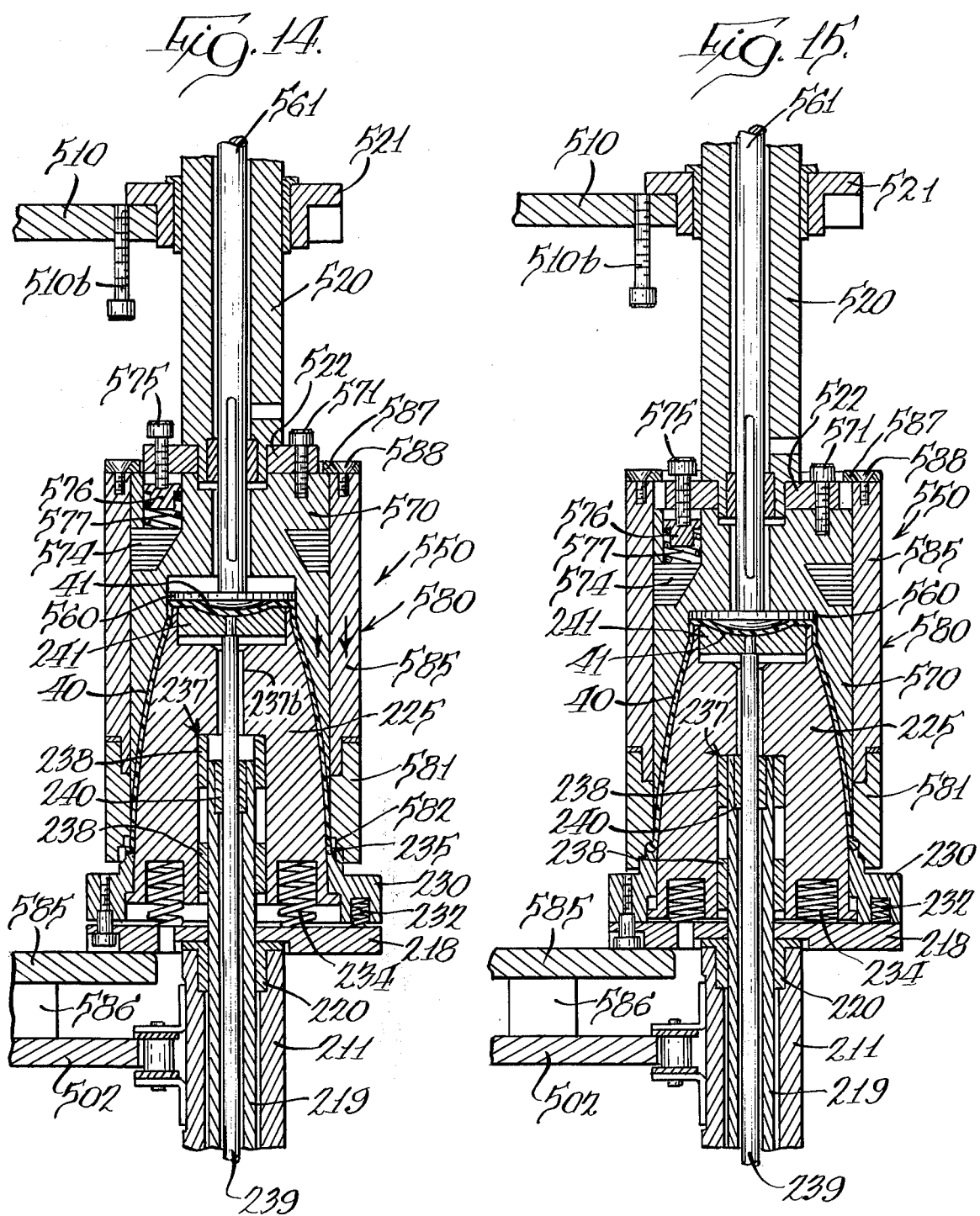

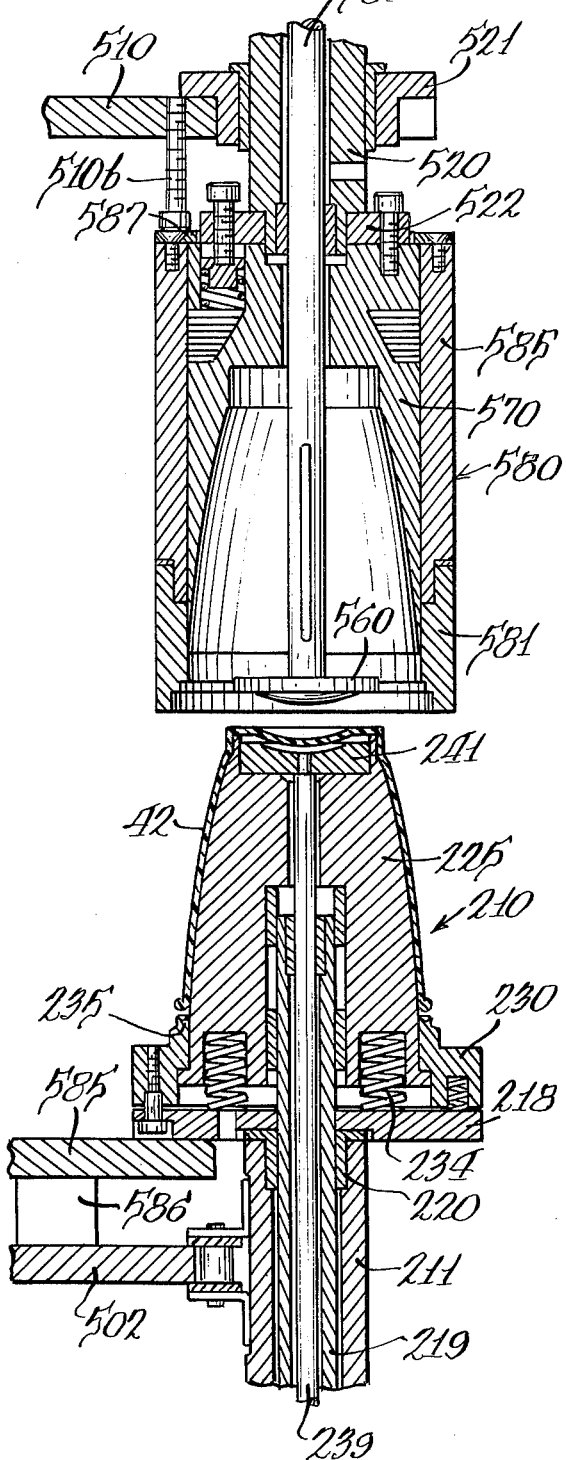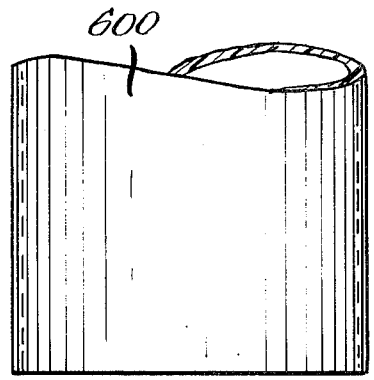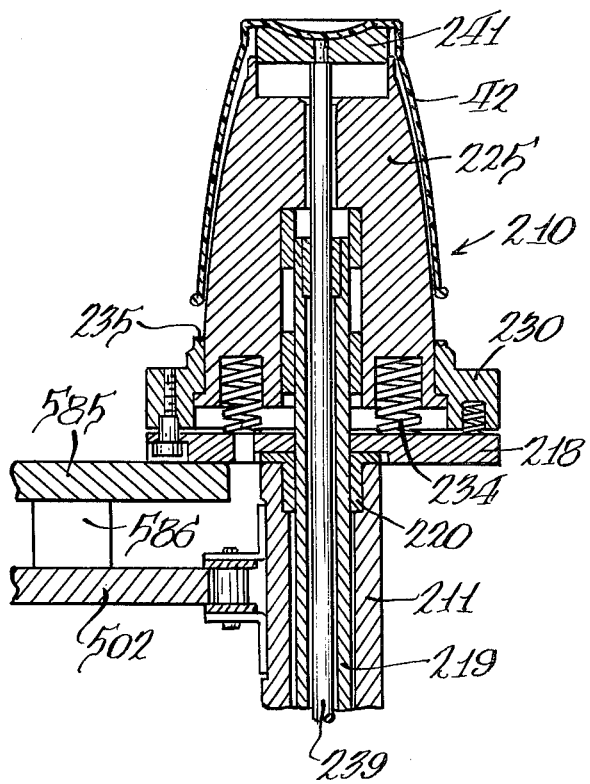

METHOD AND APPARATUS FOR FABRICATING THERMOPLASTIC CONTAINERS

BACKGROUND OF THE INVENTION

It has been recognized that drinking cups and other nestable containers with superior properties, especially for the retention of hot beverages such as coffee, can be formed from expanded thermoplastic materials, the most popular of which has been proven to be expanded polystyrene. Some different types of containers and methods for producing them have been proposed, and some have been successful in the marketplace.

Some design criteria which have been sought to be achieved are the elimination of the postprinting of the containers after they have been fabricated, the capability of producing containers with different sidewall configurations, including convex and concave surfaces by the same methods with minimum alteration to the apparatus, and the elimination of waste materials during the production of cups.

Various efforts have been directed to the production of thermoplastic cups, such as the molding of a one-piece cup directly from expanded polystyrene beads in a steam chest, the formation of a two-piece cup from a crescent-shaped blank of expanded plastic material, e.g. U.S. Pat. No. 3,468,467, and the production of a one-piece seamless deep-drawn cup, as disclosed in U.S. Pat. No. 3,666,162.

Commonly assigned, copending Amberg et al. U.S. patent application Ser. No. 354,305, filed Apr. 25, 1973, now abandoned a continuation-in-part of application Ser. No. 211,259, filed Dec. 23, 1971, now U.S. Pat. No. 3,854,583 discloses a method and apparatus for forming a two-piece nestable cup. The apparatus of this application utilizes a continuously moving conveyor carrying a plurality of spaced mandrels having an outer configuration corresponding to the inner contour of the cup. A main conveyor moves the mandrels along a closed path where a series of operational steps are performed which function in timed sequenced interrelationship to form the cup. While this apparatus functions extremely well to produce the improved nestable cup at high production speeds, the need remains for a simplified and less costly method and apparatus.

SUMMARY OF THE INVENTION

The apparatus for fabricating the thermoplastic cups in accordance with the method of the present invention includes a continuously moving main conveyor carrying a plurality of spaced mandrels having an outer external configuration corresponding to the internal contour of the cup. The mandrels are inverted as compared to those disclosed in Amberg et al., Ser. No. 354,305. A disc is deposited on the top of each mandrel as each mandrel moves into registry below a transfer mechanism. A cylindrical sleeve is then deposited axially about each mandrel as it moves past a sleeve-forming station, and the main conveyor moves the mandrels along a closed path through a series of operational stations which function in timed sequence and interrelationship with the sleeves and bottom disc closures on the mandrels to form the cup.

The discs are cut from a continuous web of thermoplastic material in a novel subassembly which at a first location partially cuts a disc from the web so that the disc may be carried by the web to a punch-out or transfer location directly above the path of the mandrels where each disc is transferred directly to the tops of mandrels. The mandrels are designed with a recessed top to receive the discs therein, and the mandrels each include a vertically movable disc support, as will hereinafter appear.

The sleeves are formed by cutting individual rectangular blanks from a continuous web of heat-shrinkable thermoplastic material, winding the sleeve within a cylindrical winding mechanism to provide overlapping end portions of the blank, transferring the wound blanks axially within the winding mechanism to a set of seaming rollers. Hot air is directed to the overlapping end portions as the blank is transferred to place them in condition for seaming by the rollers. The thus formed sleeves are then transferred by a vacuum pickup from the winder mechanism directly to the mandrels.

After the bottom disc closure and sleeve blank have been transferred to a mandrel, it passes to a tamping station which aligns and positions the cylindrical sleeve axially of the mandrel. The mandrel then passes to a heat-shrinking station, where the sleeve is heated, as by infrared radiation, to shrink and conform the sleeve to the external configuration of the mandrel and to produce inwardly extending portions at the upper end of the sleeve that overlap the bottom closure disc. The vertically movable disc support lifts the disc from the recess of the mandrel during the heat-shrinking operation so that the disc is heated to an elevated temperature whereby it may be joined to the inwardly extending portions of the sidewall. The mandrel then passes to a bottom sealing and rimming station where the inwardly extending portions of the sleeve are fused to the disc by pressure generated by upward movement of the disc support and a downwardly moving die mechanism and a bead is formed at the open end of the container.

The formed cup is then moved from the main conveyor by means of a pneumatic tube and the mandrel commences a new cycle by passing beneath the disc punch-out station.

With the process and apparatus of the present invention, cups having exceptional insulating properties can be fabricated at relatively low cost. Because the operation of the machine is continuous in nature, it is extremely smooth in operation, and achieves high production rates. Moreover, due to the compactness and low-cost of the mechanisms, as compared to prior machines, the apparatus of the present invention represents a significant advance in the cup industry.

BRIEF DESCRIPTION OF THE DRAWINGS

FIGS. 1 and 1A are perspective views of the apparatus of the present invention, with certain portions broken away for clarity of illustration;

FIG. 2 is a side elevation view of the bottom disc punching mechanism;

FIG. 2A is a perspective view, with certain portions broken away, illustrating the punching die of the bottom disc punching mechanism;

FIG. 3 is a sectional view taken along plane 3—3 on FIG. 1 illustrating the sidewall web feed and cutter mechanisms;

FIG. 4 is a perspective view, with certain portions broken away, illustrating the sleeve winding mechanism;

FIG. 5 is a sectional view taken generally along plane 5—5 of FIG. 4 and illustrating the sleeve winding mechanism and vacuum pickup and transfer device;

FIG. 6 is an enlarged perspective view, with portions broken away, illustrating details of the sleeve winding mechanism and the vacuum pickup and transfer device;

FIG. 7 is a sectional view taken along plane 7—7 of FIG. 6 illustrating the internal mechanisms of the sleeve winding mechanism;

FIG. 8 is a sectional view taken along plane 8—8 of FIG. 6 illustrating the sleeve fusing rollers;

FIG. 9 is an end elevation view of the tamper turret;

FIG. 10 is a sectional view through the shrink tunnel;

FIG. 11 is an end view, partly in section, of the rimming turret;

FIG. 12 is a perspective view of the rimming turret, with certain portions broken away for clarity of illustration; and FIGS. 13–17 are sectional views of the rimming mechanism illustrating the sequential operation of the dies.

DETAILED DESCRIPTION OF THE INVENTION

Figure 1A:
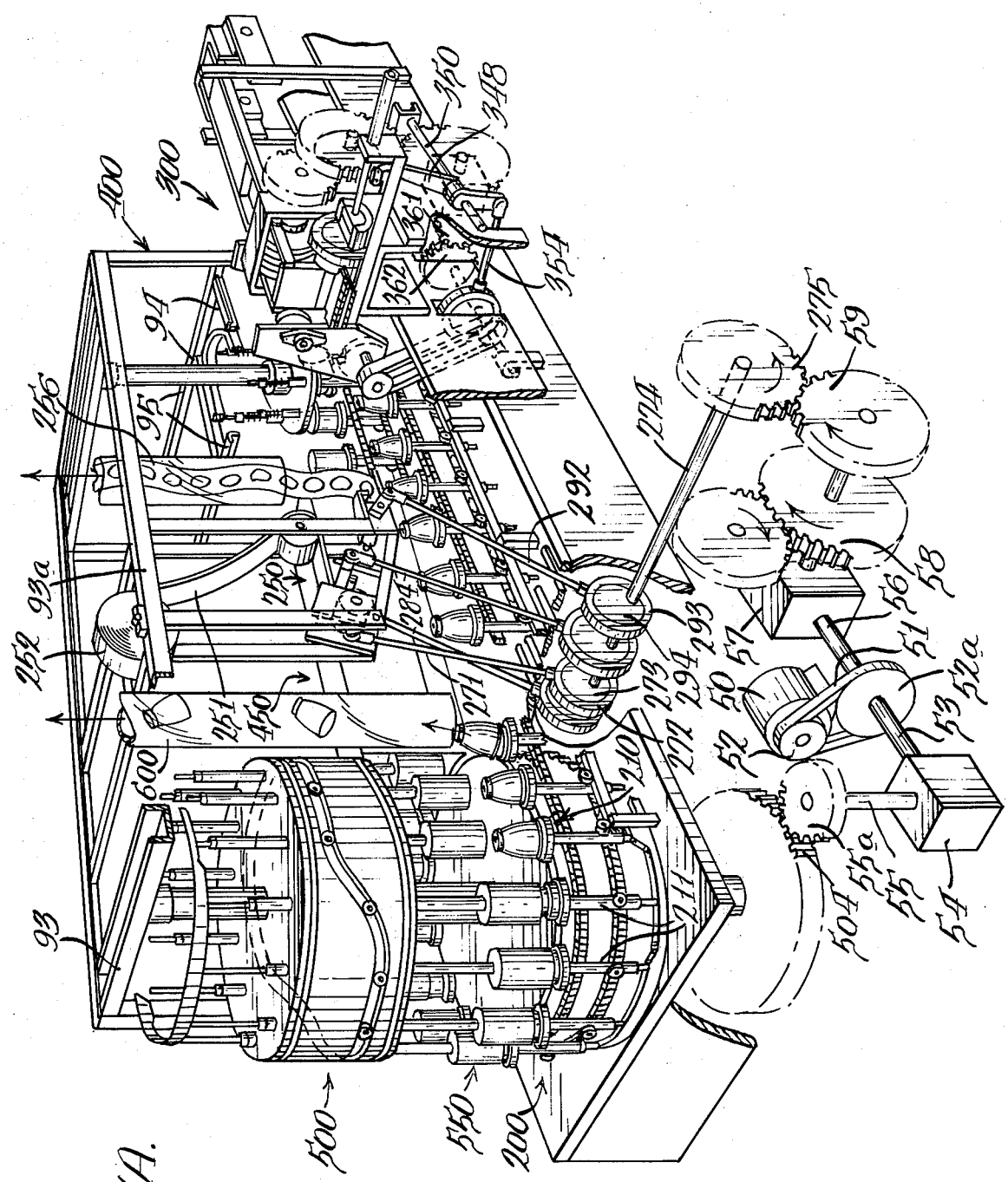

While this invention is susceptible of embodiment in many different forms, there is shown in the drawings and will herein be described in detail a preferred embodiment and methods for fabricating the containers in accordance with the present invention, and with the understanding that the present disclosure is to be considered as an exemplification of the principles of the invention and is not intended to limit the invention to the specific embodiments illustrated and described. The scope of the invention will be pointed out in the appended claims.

Referring now to FIGS. 1 and 1A, the apparatus may be considered to be comprised of a plurality of separate working stations, or subassemblies, which are hereinafter described individually. The apparatus of the present invention is summarized immediately herebelow, and the separate working subassemblies are subsequently discussed in detail essentially in the sequence in which they operate to form a cup in separate sections of the specification.

With specific reference to FIG. 1A, a main conveyor 200, having a plurality of spaced mandrels 210 thereon, moves continuously in a counterclockwise direction. The mandrels have an external contour corresponding to the desired internal contours of the fabricated cup. A bottom disc cutting and transfer mechanism 250 is positioned above the conveyor path at approximately the middle of the front straight run portion of the conveyor path, and this mechanism includes an initial disc cutting die that partially severs a disc from a continuous web of stock, and a punch-out mechanism which transfers the disc from the web in which it is carried into a recess in the top of a mandrel.

A sleeve forming mechanism 300, located adjacent the straight run portion of the conveyor path, receives blanks of thermoplastic material from web handling and feeding subassemblies, and forms and seams the blanks into a cylindrical sleeve. A vacuum transfer subassembly 360 at this working station transfers the cylindrical sleeves laterally and deposits them in essentially concentric relationship with the continuously moving mandrels. The conveyor then moves the mandrels to a tamping turret mechanism 430 located at the right-hand end turn of the machine, which aligns any askew sleeves axially of the mandrels.

After alignment, the sleeves are carried through a shrink tunnel 450 located along the rear straight run portion of the machine, which causes the cylindrical sleeve to shrink to the contour of the exterior of the mandrel and heats the bottom closure disc, carried in the top of the mandrel.

The mandrels then pass to a rimming and bottom sealing turret mechanism 500 located at the left-hand end turn of the machine, which seals the bottom discs to the sidewalls of the shrunken cylindrical sleeves and forms a rim at the open end of the container.

The formed cups are removed from the mandrels by an ejection tube 600 located immediately downstream from the bottom sealing and rimming turret. The mandrels then commence another cycle by passing beneath the bottom punch-out mechanism 250, and the entire cycle is repeated.

While the various mechanisms and process steps are hereinafter discussed individually, it should be understood that the various steps and operations are performed in timed sequence in proper interrelationship with respect to one another so that the various mechanisms cooperate in the form of a true combination.

The main conveyor 200, which transports the cup forming mandrels 210 through the above mentioned series of operational stations, moves continuously along a closed path in the form of a flattened ellipse, although it should be understood that paths having other shapes, such as circular, are within the contemplation of the invention.

During initial start-up of the machine, the main conveyor 200 may be run through the machine for several cycles without webs being fed to the bottom punching mechanism or the sidewall winding mechanism so that the mandrels are initially pre-heated in passing through the shrink tunnel to an equilibrium temperature in the range of 150° to 180° F. This initial pre-heating of the mandrels assures substantially even shrinkage of the cylindrical sleeve.

MAIN CONVEYOR AND DRIVE SYSTEM

The main conveyor 200 includes two endless chains 201 and 202, FIGS. 9 and 11, spaced vertically from one another, and a plurality of spaced mandrels 210 connected to chains 201 and 202 by brackets 203 and 204, respectively. The brackets are attached directly to vertical support members 211 which extend downwardly from the bottom of mandrels 210. Chains 201 and 202 are driven at the left-hand end turn, FIGS. 11 and 12, by turret shaft 501 and vertically spaced, horizontal sprockets 502 and 503 disposed at the elevation of the brackets 203 and 204. Chains 201 and 202 are carried at the right-hand end turn, FIG. 9, on spaced idler sprockets 402 and 403 disposed vertically upon shaft 401.

Extending radially outwardly from support members 211 are support roller assemblies 212, FIG. 9, which include a roller 213 rotatably attached to member 211 by means of a spacer 214 and bolt 215. The support roller assemblies are designed to support the conveyor-carried mandrels in the straight run portions of the machine by riding on the upper surface of guide track members 216 which extend the length of the straight run portions of the machine and are supported on a base frame member 90 of the machine by spaced brackets 217 along their length.

Referring now to FIGS. 1A and 12, the main conveyor 200, as indicated above, is driven by turret shaft 501 at the left-hand end turn, and shaft 501 is driven at the bottom portion thereof by spur gear 504. Spur gear 504 is driven from the main drive system which includes a prime mover 50 which drives a belt 51 through a pulley 52. Belt 51 in turn drives a pulley 52a associated with two horizontal and coaxially-disposed right angle gear box shafts 53 and 56. Right angle gear box 54 is driven by shaft 53 and in turn drives a vertical shaft 55 and gear 55a, which meshes with spur gear 504 to provide the drive for the main conveyor 200.

Shaft 501 is rotatably mounted on the machine base member 90 below the elevation of the conveyor by means of a bushing 91 which provides for the free rotation of the shaft therein. The upper end of shaft 501 is rotatably mounted in a bushing 92 which is fixedly positioned on an upper cross brace member 93.

Sprockets 502 and 503 are mounted, as by bolts 508, on vertically spaced horizontal flanges 505 and 506 extending outwardly from a sleeve 507 on shaft 501. Sleeve 507 is fixedly attached to shaft 501 for conjoint rotation therewith in a suitable manner, as by keying.

Left-hand end turn sprockets 402 and 403, FIG. 9, are mounted on shaft 401 by means of a sleeve 407, similar to sleeve 507, which rotates conjointly with shaft 401, by means of vertically spaced horizontal flanges 405 and 406, respectively, and bolts 408. Shaft 401 is mounted on base member 90 by bearing means 409 at its lower end and a bearing means 410, FIG. 1, mounted on cross brace member 93, at its upper end.

FORMING MANDRELS

Figure 13:
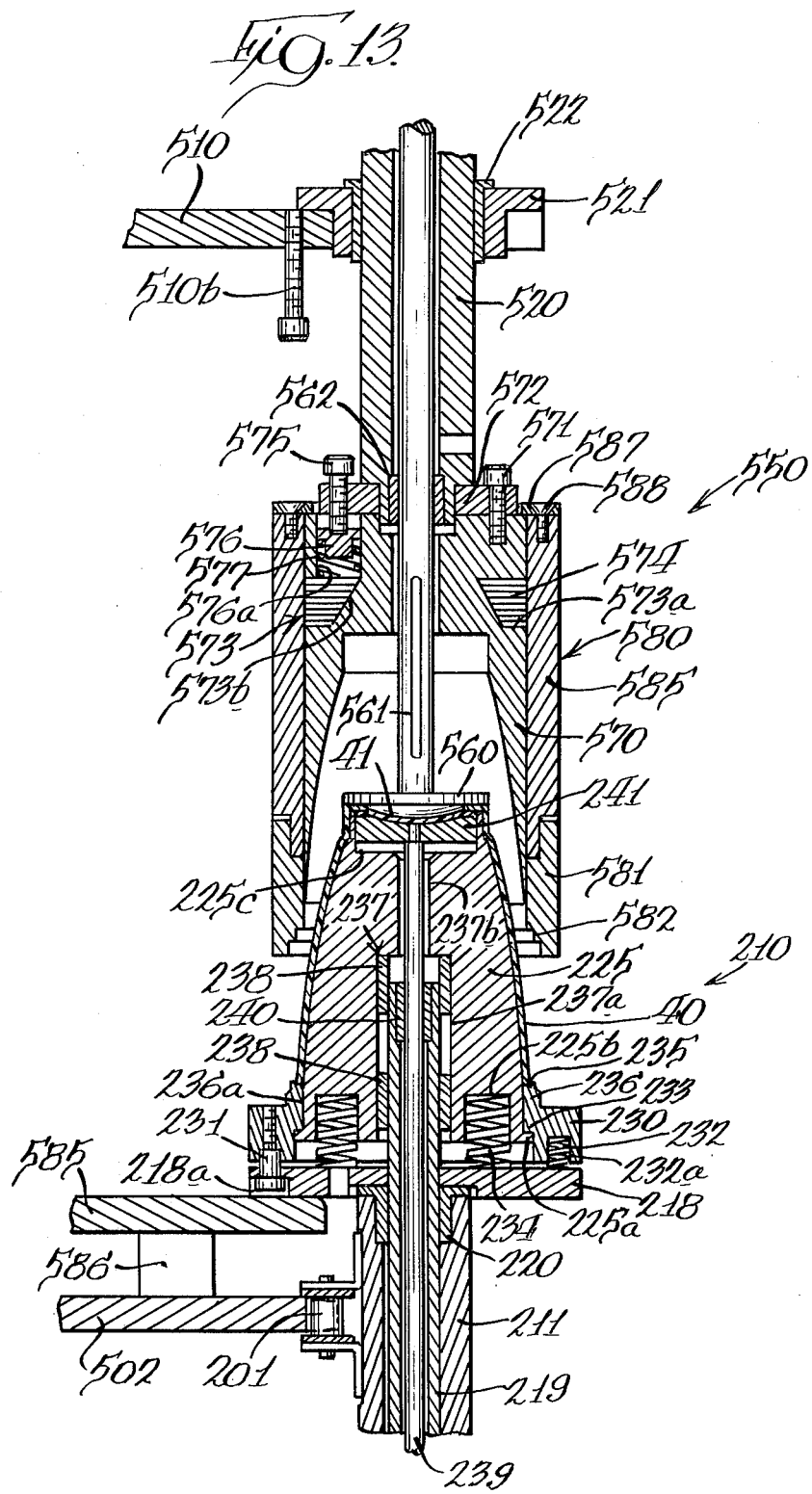

Each forming mandrel 210, FIG. 13, includes a contoured forming member 225 generally of frusto-conical shape whose sides define the interior side contour of the cup to be formed. Forming member 225 is slidably carried in an annular mounting ring 230 which is mounted upon the upper surface of a horizontal base support 218 by bolts 231. Bores 218a are provided in support 218, and bolts 231 are free to move vertically therein. Compression springs 232 are seated within downwardly opening bores 232a in ring 230 and bear against support 218 to provide a slight cushioning effect during the rimming operation, as discussed below.

Each base support member 218 is rotatably mounted to support member 211 by means of a spindle assembly, FIG. 13, which includes a hollow, vertically extending spindle member 219 located in support 211 and fixedly secured to base support member 218. The base support member 218 and spindle 219 are rotatably supported on the top of member 211 by bearing 220. The spindle 219 extends upwardly into the center of the contoured forming member 225 and extends beyond the lower end of support member 211 at the other end to mount a collar 221, FIG. 11, which is utilized to rotate the mandrel during the shrinking cycle, as will be discussed in further detail below.

The interior annular edge of ring 230 provides a downwardly facing horizontal shoulder 233 which is engaged by an outwardly extending horizontal flange 225a formed at the bottom edge of forming member 225. Vertical compression springs 234 located beneath forming member 225 in vertical recesses 225b in member 225 bear against the top surface of base support 218 to bias the forming member 225 upwardly and place flange 225a in contact with shoulder 233 in an inactive position.

As will be described in greater detail, the formed cup is rimmed on the mandrel 210 by depressing forming member 225 relative to ring 230 to force the lip of the cup into a rim die cavity. One-half of the rimming die is formed in ring 230 and comprises an arcuate cross-sectional annular die 235 formed above shoulder 233 at the top of a vertical extension 236 of the ring. This vertical extension has a finished interior surface 236a in juxtaposition with the lower portion of the side contour of forming member 225 and provides a cylindrical guide for the forming member as it is depressed to form the rim.

The forming member 225 is provided with a central passage 237 extending the length thereof. The lower portion 237a of the passage is enlarged to receive upper end of spindle 219 which is supported therein by means of two bearings 238 spaced vertically in portion 237a so that the forming member may move vertically with respect to the spindle during the rimming operation.

A vertical cam rod 239 is coaxially disposed within spindle 219 and slidably mounted therein by a bushing 240 at each end of the spindle. Rod 239 extends through an upper reduced diameter portion 237b of passage 237 and is attached to the bottom of a horizontal support plate 241 which supports the bottom closure disc 41 of the cup in a recess 225c at the top of member 225. Rod 239 extends below the end of spindle 219, FIG. 11, to provide a means for raising and lowering the disc from recess 225c during the heating and bottom sealing operations, discussed below, through the influence of cam tracks 460 which reciprocate the cam rod.

Support plate 241 is circular in shape, and the upper surface thereof is concavely contoured to shape the interior bottom portion of the container during the bottom sealing operation.

SIDEWALL WEB HANDLING AND FEED MECHANISMS

Sidewall web stock 36 is supplied from a spool mounted roll 37, FIG. 1, to a web processing path spaced from the main conveyor 200 and above the elevation of the top of the mandrels. Web stock 36 is unwound from spool 37 by means of a pair of vertically spaced feed rollers 101 and 102 which are suitably mounted on the frame by means of shafts 101a and 102a, and bearings 103 and 104, respectively. Shafts 101a and 102a are provided with meshing gears 105 and 106, respectively, to provide for the conjoint rotation thereof. Feed roller 102 is driven by prime mover 50 by an outboard drive gear 107 which is driven by gear 58 from gear box 57 through two transfer gears 108 and 109 to provide power input to the feed rollers.

The web stock 36 is fed to the feed rollers with the decorated surface, if any, of the web stock on the upper surface of the stock. As the web passes between the feed rollers, the decorated surface is oriented downwardly. Arcuate guide means 110 is mounted at the end of the machine to form an S-shape in the web to place the decorated surface up and to direct the web to an elevated feed line support surface 111 above the feed rollers.

As will be pointed out in greater detail below, the web stock 36 is fed intermittently along the web-handling subassemblies and to accommodate fluctuations in demand for web, the web encompassing the arcuate guide track 110 may function as a supply loop. And, to this end sensing means, such as electric eye and associated controls (not shown) may be provided to control the rotation of feed rollers 101 and 102 to provide a constant supply of unwound stock web, as is known in the art.

After the web 36 has been positioned on the horizontal guide member 111, the feed of stock is controlled by a brake assembly 120 and a segment feed roll assembly 130, FIG. 3, which control the movement of web stock 36 to a cutter mechanism 160 and its insertion into the winder mechanism 300.

With reference to FIGS. 1 and 3, the segment feed roll assembly 130 comprises two rotating rollers 131 and 132 which are driven from the prime mover gear train through a gearing system including gears 108, 112, 113, 114, and 115. Segment feed rollers 131 and 132 are rotatably mounted in a box frame member 136 by shafts 133 and 134, respectively. The shafts are provided with gears 135 which intermesh to provide for conjoint rotation of the rollers, FIG. 1. The segment feed rollers are generally cylindrical in shape and are provided with axially spaced arcuate segment portions 131a and 132a, respectively, of increased diameter which extend approximately 180° around the periphery of each roller and are designed to engage the web 36 therebetween to provide intermittent horizontal movement of the web into the cutter and winding mechanisms downstream of the rollers. Complementary dwell segments 131b and 132b are provided in the rollers to intermittently terminate web feed.

Upper roller 131 is mounted for vertical movement relative to frame member 136 by means of end bearings 137 and slide blocks 138, which are slidably positioned in vertical slots 136a in the frame member to provide for adjustment of the upper roller. Each slide block 138 engages the vertical edges of slot 136a and is provided with an adjustment stud 139 disposed vertically upwardly from the top thereof and passing through a stud hole (not shown) in the top portion 136b of frame member 136. Each stud is provided with an elevation adjustment nut 139a threaded on the stud above top portion 136b to adjust the position of the top roller relative to the bottom roller. Each adjustment stud 139 is further provided with a concentric spring 139b and spring adjustment nut 139c below top portion 136b to resiliently load gears 135 during the rotation of the segment rollers and thus absorb any rotational shock and deviation in the thickness of web 36 and adjust the pressure exerted thereon during operation.

The lower segment roller 132 is rotatably mounted to frame member 136 by end bearings 140, FIG. 1, and receives power input from gear 115 which is mounted outboard of bearing 140 on shaft 134.

Since it is desired to provide discrete intermittent movement of the web 36 into the cutter station and winder mechanisms, a brake mechanism 120 is provided upstream of the segment feed roller assembly 130 to assure proper braking of web 36 after it has been fed forwardly by segments 131a and 132a. Brake assembly 120 consists of a brake shoe 121 which is fixedly mounted on shaft 122, which in turn is pivotally mounted on frame member 136 by bearings 123. The movement of brake shoe 121 is controlled by a lever 124 which is attached at one end to the outer end of shaft 122, FIG. 1, and which is provided with a follower roller 125 at the other end. Roller 125 rides on the cam surface of a rotating cam 126 which is mounted on a horizontal shaft 127 and which is driven by gear 113 of the segment gear drive assembly to assure proper functional relationship between the brake mechanism 120 and segment rollers 131 and 132. The surface of cam 126 is designed to place brake shoe 121 into engagement with the upper surface of web 36 and to bias the web against horizontal guide support 111 to provide proper braking of web feed when the segments 131a and 132a are out of contact with the surfaces of web 36.

As the segment feed rollers transfer the web 36 along the horizontal process path, the web is supported on horizontal support members 161 and 162 which direct the web to the cutter station 160 and to the winding station 300, respectively.

As is clear from FIG. 3, support member 161 is spaced from support member 111 to enable the rollers 131 and 132 to engage web 36. Similarly, support member 161 is spaced from support member 162 to provide clearance for the web cutting mechanism. A cutter blade 163 is provided at the cutter station 160, and is reciprocated upwardly into engagement with web 36 to sever a blank 35 from the web after the leading edge of the web has entered the winding station 300. The cutter blade 163 is mounted on a reciprocating platform 164 beneath the web process path and a crankshaft 166 is pivotally connected to a downwardly extending bracket 165 on platform 164 by a pin 167. Crankshaft 166 is vertically disposed and coupled to a cam collar 168 which rides on an eccentric cam 169 mounted on shaft 170. Shaft 170 receives power input from gear 114 of the segment gear drive system by means of end-mounted gear 171, which assures proper functional relationship between the cutter, the brake mechanism, and the segment feed rollers.

Blanks 35 are severed from web 36 as platform 164 and blade 163 are reciprocated in vertical L-shaped guides 172 of the cutter assembly which define the vertical path for platform 164 and which are attached at their upper end to a horizontally disposed top member 174. Blanks are severed from web 36 by a shearing action between blade 163 and a stationary back-up member 173 depending from top member 174 and disposed in an offset position from the leading edge of cutter blade 163.

A resiliently biased web holding member 175 is mounted adjacent to and upstream of cutter 163 on platform 164 and cooperates with the lower surface of back-up member 173 to provide a means for holding web 36 during the severing of blanks therefrom. Holding member 175 is mounted on platform 164 by a mounting bracket 176 secured to the upper surface of platform 164. A slide bolt 177 is threaded to the lower end of member 175 and vertically slidably retained within a bore defined by member 176. A spring 178 is disposed between holding member 175 and back-up member 176 to provide for resilient engagement of web 36 when platform 164 is reciprocated upwardly and a blank 35 is cut therefrom.

WINDER MECHANISM

As previously described, the segment feed rollers 131 and 132 direct the web stock 36 past the cutter station and into the winder station 300. Each cut blank 35 is formed into a cylindrical sleeve 40 by wrapping it within the internal cylindrical cavity in a winding member 310, (FIGS. 7 and 8) positioned transversely to the path of web feed on frame 97, by feeding the blank between the nip between an enlarged diameter power-driven roller 330 disposed adjacent member 310 and a back-up roller 306 located within the cylindrical cavity in member 310. Back-up roller 306, FIG. 7, is an elongated roller corresponding in length to the width of blank 35 and is mounted on a semi-circular arbor member 315 within the cylindrical cavity of winding member 310. Arbor member 315 provides a guiding surface for the blank as it enters the cavity and a directing surface for positioning the leading end of the blank during completion of the wrapping operation, as described in greater detail below. After the blank has been formed into a cylindrical sleeve, the sleeve is transferred laterally in the winder member cavity by means of a reciprocating ram 320, and during this movement the end portions of the sleeve are exposed to hot air in the range of 775° – 825° F., to soften the juxtaposed surfaces of the sleeve and place them in a condition for sealing. At the end of the stroke of ram 320, the leading edge of the circular sleeve is introduced between the nip of sealing rolls 342 and 343, FIG. 6, which compress the softened overlapping end portions of the sleeve and form a seal therebetween. Sealing roll 342 is driven and thus conveys the cylindrical sleeve laterally to the end of the winding member 310 where a rotating vacuum pickup assembly 360 picks-up the seamed cylindrical sleeve 40 and transfers it in a curvilinear path to deposit in on a mandrel 210, which has moved into registry with the vacuum transfer assembly.

With reference to FIG. 4, the driven components of the winder assembly receive power from gear 171 through a gear drive system including gears 301, 302, 303, 304, and 305. As the blank is fed forward by driven roller 330, it passes beneath a cover member 311 which introduces the leading edge of the web into an entrance cavity 310a (FIG. 7) in the upper surface of the cylindrical winding member 310. A lead-in surface is provided by a generally triangular shaped member 312 at one side of opening 310a to deflect the leading edge of the blank 35 and direct the same along the winding cavity between the internal surface of winder 310, and the outer surface of arbor 315, and between the nip of rollers 306 and 330.

Roller 330, FIGS. 4 and 6, is mounted on shaft 331, which is rotatably mounted on a box frame member 332 that is attached to machine frame 97. Shaft 331 is driven by gear 305 to rotate roller 330 in a counterclockwise direction when viewed from the front of the machine, as shown in FIG. 4. Roller 330 consists of a generally cylindrically shaped roller having a plurality of axially spaced rib protrusions which form bearing surfaces 330a and dwell surfaces 330b. Bearing surfaces 330a are designed to correspond in length to the length of the blank 35 to be wrapped within the winder member and the dwell surfaces 330b provide a dwell portion during which time the wrapped blank is transferred by ram 320 to the hot air nozzle and seaming rollers.

When the blank is being wound by bearing surfaces 330a and back-up roller 306, the leading edge of the blank is forced around the internal surface of winder member 310 and the blank assumes a cylindrical shape. A generally Z-shaped bar 316 is attached to arbor 315, and bar 316 includes a first leg 316a embedded in the arbor, a second leg 316b disposed in spaced relationship with respect to the arbor, and a third upwardly extending leg 316c. The internal surface of the winder member is configured to provide an inwardly converging directing lip or surface 310b near the blank entrance portion of the winding member which deflects the leading end of the blank downwardly beneath leg 316b of bar 316.

After the blank has been completely wound within the winder member and the leading edge has been introduced beneath the horizontal portion 316b of bar 316, the trailing edge of the blank is in an overlapping position with respect to the leading edge of the blank and just beyond the upwardly extending portion 316c of bar 316. At this point, a holding bar 340 is cammed downwardly to position the trailing edge of the blank on the upper surface of the horizontal portion 316b of the bar to hold the trailing edge in overlapping position as the blank is transferred laterally by ram 320. Holding bar 340, FIGS. 4 and 6, is attached at each side to a cantilever lever 341 which is pivotally attached to frame member 332.

A cam roller 341a is attached to the midportion of each lever 341 and rides on a cam 331a mounted on shaft 331 adjacent each end of roller 300. Cam 331a is designed to lower bar 340 into engagement with the trailing edge of blank 35 during the dwell portion or roller 330 to hold the trailing edge in overlapping relationship to the leading edge of the blank during the seaming operation, discussed below.

Ram 320 is a generally sector shaped member, FIGS. 4 and 5, and is slidable in the lower half circle portion of the winding cavity in member 310. Ram 320 is supported in a retracted position during the sleeve wrapping step on an arcuate extension 310c (FIG. 4) at the front of the winding member. The ram is moved longitudinally in the wrapping cavity by a horizontal rod 345 attached at one end to the ram and positioned in the bore of a slide collar 346 which is fixedly mounted on an L-shaped bracket 347 extending from the front of the machine adjacent the winding member.

The ram 320 is reciprocated in timed relationship with the other operations of the machine through a rocker arm assembly comprising a vertically disposed rocker arm 348, pivotally attached at its midportion to the machine frame by pivot pin 350 and end brackets 351 and 352. The upper end of arm 348 is attached to the midportion of rod 345 by link 353, and the lower end of arm 348 is attached to a horizontally disposed driver rod 354, the other end of which is attached to a cam follower 355. Driven rod 354 is reciprocated horizontally by an eccentric cam 356 driven by power shaft 357 through follower 355. Power shaft 357 is horizontally disposed and rotatably supported on the machine frame by bearing 358, and shaft 357 is driven from gear 302 through right angle gear box 359, drive gear 361, and drive gear 362 which is mounted on the power shaft.

As ram 320 moves the wrapped sleeve in the winding member, hot air is directed between the overlapped end portions from converging nozzle 363, FIG. 8, which extends into a cut-out 364 in the winding member to heat and soften the abutting surfaces of the blank for seaming.

The leading portion of the blank then enters the nip between rollers 342 and 343 for seaming. Roller 343 is rotatably mounted in arbor 315 by axle 365 in vertical orientation and extends upwardly through a cut-out 315a in the arbor to engage the bottom surface of the leading edge of the blank. The surface of roller 343 is concave in shape to accommodate the arcuate surface of the blank.

The external periphery of roller 342 has a complementary concave surface to roller 343 and is positioned adjacent roller 343 in a radially outwardly open cut-out 364 in member 310. As can be seen in FIG. 8, the radius of curvature of the external surface of roller 342 is approximately the same as the radius of curvature of the internal cavity in member 310. Roller 342 is driven by a shaft 366 that is rotatably mounted in frame members 342a by bearings 367, FIG. 5. As each wound blank is transferred axially, the horizontal portion 316b of the Z-shaped bar 316 provides a space between the edges, and nozzle 363 is flattened to provide a converging outlet which directs hot air in the space and against the facing surfaces of the blank to soften the end portions. The spacing between the facing surfaces of rollers 342 and 343 is such that when the softened overlapped end portions are received therebetween, the end portions will be compressed and seamed. Bar 340 remains in contact with the trailing end of the blank to keep the trailing edges in contact with the horizontal portion 316b of the Z-shaped bar 316 until the blank has been received by rollers 342 and 343. In this manner the natural resiliency of the material, which might cause it to unwind, is overcome, and the sleeve is positively maintained in a cylindrical shape until seamed.

With reference to FIG. 5, shaft 366 is driven from right angle gear box 359 through pulley 368, belt 369 and pulley 370 mounted on shaft 366 so that, as the overlapping end portions of the blank are seamed, the sleeve 40 is moved axially and transferred by the rollers out the end of the winding member.

A rotating vacuum pickup head 360 is positioned at the end of the winding member below the elevation of the seamed sleeves to transfer them onto a mandrel 210 which has been moved into registry therewith. Pickup head 360 consists of a two member circular wheel 371 on a horizontal shaft 372 that is mounted on frame members 342a. Member 371a is utilized to selectively provide vacuum to the pickup head. To this end, member 371a is provided with an arcuate shaped vacuum chamber 371c at its surface abutting member 371b which extends through an arc of about 105° in the upper half of member 371a corresponding to the arc through which the sleeves are carried by the pickup head. A discharge port 371d is provided in member 371a and port 371d lies on a common radius with passage 371c and spaced about 25° therefrom. Member 371a is fixedly attached to frame member 97 by a bracket 97d, and shaft 372 is freely rotatable within member 371a.

Member 371b is fixedly attached to shaft 372 for conjoint rotation therewith and is in sealing engagement at its abutting surface with member 371a. Two pickups 373 extend outwardly of member 371b at diametrically opposite positions. Each pickup includes an arcuate aperatured support 373a, having a curvature corresponding to the sleeves so that the sleeves are carried therein, a hollow mounting shaft 373b which mounts the support to member 371b. Member 371b is provided with a generally L-shaped passageway 373c which is in communication with the aperatured support through shaft 373b at one end, and is opened to the abutting surface of member 371a. The opening is formed on a common radius with chamber 371c and port 371d so that as member 371b is rotated by shaft 372, pickups 373 are rotated into underlying relationship to a sleeve at the end of the winding mechanism, vacuum is supplied to affix the sleeve to the pickup and the sleeve is rotated into a vertical orientation and placed about a forming mandrel, and the vacuum is terminated and the aperatured support is exposed to atmosphere through port 371d (or pressurized air) to release the sleeve.

Rotational drive for the pickup head 360 is provided by shaft 357 through pulley 374, belt 375 and pulley 376 on shaft 372. Since shaft 357 receives power from gear 302 of the main drive, drive to the pickup head is in timed relationship with the other sleeve winding elements and the movement of the mandrels so that the various elements function as a combination.

BOTTOM PUNCH MECHANISM

While a blank 35 is being wound in winding mechanism 300, a bottom disc 41 is cut and transferred from a supply web 251 into the recess 225c in the top of a forming member 225 to be supported on horizontal member 241. Referring to FIGS. 1A and 2, bottom disc web stock 251 is supplied from a frame-mounted supply roll 252 to a ratchet driven unwinding roller assembly 253. Unwinding roller assembly 253 first directs the web beneath a punching die assembly 254 which partially severs a disc 41 from the web, as will be described in greater detail below, and then directs the web to a transfer mechanism 255 which transfers the partially cut discs from the web 251 onto the top of the mandrels. The remaining portion of the web, after discs have been removed therefrom, is removed from the machine by a vertical pneumatic tube 256 which draws the waste web by vacuum for suitable disposal.

The entire bottom punching mechanism 250 is supported from the top front machine frame member 93a above the path of the conveyor in an essentially U-shaped mounting bracket assembly including two sets of vertically disposed spaced apart brackets 256 and 257. Brackets 257 cooperate with brackets 256 to support an inclined web-carrying platform 258 therebetween. Roller 259 carried by a shaft 260 is mounted between brackets 257 above platform 258. The web 251 is directed from supply roll 252 around roller 259, between the nip of a ratchet driven roller 261 and a backup roller 262, and thence to platform 258.

Unwinding roller assembly 253 is mounted between two vertically spaced apart rectangular plates 263 mounted on platform 258 and supported at their upper corners by horizontal spacer bars 265 and 266, which extend therebetween. Backup roller 262 is rotatably mounted on a shaft 263 which is supported at the lower end of vertical brackets 264, the upper ends of which are fixedly attached to spacer bar 265.

Roller 261 is carried by a shaft 267 that is rotatably mounted between plates 262 above platform 258. A ratchet gear 268 is mounted on shaft 267 adjacent roller 261 and receives power input through a spring loaded (not shown) pawl 269. A ratchet bracket 270, generally triangular in shape, is pivotally mounted at one apex on shaft 267 adjacent gear 268 and pawl 269 is pivotally mounted at a second apex of bracket 270, with its toothed end portion in juxtaposition with ratchet gear 268. Power is supplied to bracket 270 through a crankshaft 271 attached at the third apex thereof and at its lower end to a cam follower 272, FIG. 1A. Cam follower 272 is mounted concentrically about an eccentric cam 273 which receives power input from shaft 274. Shaft 274 drives the entire bottom punching mechanism 250 by means of gear 275 which meshes with gear 59 to receive power from the prime mover. As shaft 271 is moved downwardly, pawl 269 engages gear 268 to unwind the web. When shaft 271 is moved upwardly pawl 269 disengages gear 268 and over-rides it until shaft 271 moves downwardly.

A second backup roller 276 is mounted upon a shaft 277 that is supported on platform 258, with roller 276 being located immediately beneath roller 261 and with the nip between rollers 261 and 276 being positioned at the elevation of the upper surface of platform 258. Rollers 261 and 276 direct the web 251 along platform 258 to the punching die assembly 254.

Punching die assembly 254, FIG. 2A, includes a die 278 mounted on platform 258 and a reciprocating disc cutting die 279 which is reciprocated into engagement with web 251 to partially cut discs 41 from the web. Die 279 is designed to cut discs 41 from the web, except for two small tabs 41a which function to carry the discs with the web to the transfer assembly 255. Die 279 is attached on the lower surface of a slide plate 280 which is slidably mounted by bushings 282 on two spaced apart, vertically extending slide columns 281 extending upwardly from die 278. Slide plate 280 is reciprocated to move die 279 into engagement with web 251 by means of eccentric cams 283 on shaft 274 which drive the plate through two crankshafts 284. Crankshafts 284 are pivotally connected to the sides of plate 280 at their upper ends by pins 285, and receive power input from eccentric cams 283 by means of cam followers 286 at their lower ends.

Die 278 is provided with a recess (not shown) to accommodate die 279 and a guide recess 278a which corresponds in width to the width of web 251 to provide a guide track therefor. After discs 41 have been partially cut from the web, the web is indexed longitudinally along platform 258 between generally horizontal guide rails 287a and 287b mounted to platform 258 downstream of the punching die assembly. Guide rails 287a and 287b provide positive support and guidance of the web. The web is then received between a second set of guide rails 288a and 288b which position the web below the transfer finger 289 of the disc transfer assembly immediately above the elevation of the path of the tops of the conveyor carried mandrels.

Transfer finger 289 is generally U-shaped and oriented in an inverted position with one leg being fixedly attached to a transverse shaft 290 which is pivotally mounted at the free end of an extension at the lower end of brackets 257. The free end of the other leg of finger 289 functions to punch and transfer each disc from the web into the top recess of the mandrel. Shaft 290 is powered by an eccentric cam drive on shaft 274 and a pivot arm bracket 291, attached at one end to shaft 290 and at the other end to a crankshaft 292 by pin 293. Crankshaft 292 mounts a cam follower 293 at its lower end which rides on an eccentric cam 294. It will be appreciated that the drive to the punching mechanism 250 is driven in timed relationship with the winding of sleeve blanks and movement of the main conveyor such that discs 41 are transferred onto the tops of the mandrels which are brought into vertical registry with transfer assembly 255.

TAMPING TURRET MECHANISM

After the cylindrical sleeve 40 has been positioned about a mandrel, the mandrel is carried to the right-hand end turn, FIG. 9, where a tamping mechanism 430 is cammed downwardly into contact with the upper edge of the cylindrical sleeve to axially align the sleeve with the forming member 225 and seat it on the rimming die on ring 230. It will be appreciated due to the high-speed of operation of the vacuum transfer wheel 360 and the rate of linear movement of the mandrels, it is not preferable to attempt to align the sleeves 40 about the mandrel surfaces when they are transferred by the vacuum wheel. Rather a turret mounted mechanism which may be rotated in vertical registry with the mandrels is preferred, as shown in FIG. 9.

The tamping turret mechanism 430 comprises a plurality of horizontally disposed tamping plates 435 which are reciprocated downwardly into engagement with the top of cylindrical sleeve 40 by means of an arcuate cam 445 having a downwardly facing cam surface 445a. Referring to FIGS. 1A and 9, the tamping plates 435 are positioned at circumferentially spaced positions overlying the conveyor path by a horizontal turret plate 436 spaced upwardly from the path of the tops of the mandrels. The tamping plates are mounted on a common radius with the main conveyor 300 and are positioned to provide for vertical registration of the tamping plates with the conveyor carried mandrels 210 as they pass around the right-hand end turn.

A collar 437 is secured to shaft 401 for rotation therewith, and conjoint rotation of the tamping mechanism with the conveyor carried mandrels is provided by connecting turret plate 436 to the horizontal flange 437a of collar 437, as by bolts 438. Turret plate 436 is generally annular in shape and is provided with a plurality of vertically extending guide sleeves 440 at circumferentially spaced locations around its outer periphery. Rods 441 extend upwardly from plates 435 through bores in sleeves 440, and the upper end of rods 441 ride along a cam 445. Each cam rod 441 is biased upwardly from its respective sleeve 440 by a compression spring 442 positioned between a collar 443 which is secured to the upper end of rod 441, and the upper surface of sleeve 440 to bias the rod 441 into contact with surface cam 445a.

Cam 445, which is designed to control the vertical movement of the tamping plates 435, extends approximately 190° around the right-hand end turn and is secured to longitudinally spaced apart cross members 94 above the path of the upper end of rods 441. Cross members 93 are attached at each end to transverse cross members 95 of the machine frame, FIG. 1A. The cam surface 445a is designed to gradually lower each tamping plate 435 into engagement with the upper edge of a sleeve 40, as shown in phantom line on FIG. 9, so that any askew sleeves are properly aligned on forming member 225 and seated on the rimming die in ring 230. When each tamping plate has been lowered to its lowermost position, it is held in this position for a short dwell period and then raised by the compressed spring 442 as the cam surface 445a rises rapidly at the end of the right-hand end turn.

After the sleeve has been aligned on forming member 225, the conveyor 200 carries the mandrels to a shrink tunnel wherein the thermoplastic cylindrical sleeve 40 is shrunk to the contour of the sidewalls of forming member 225 and the bottom disc is raised from the recess in the top of the forming member to be heated. Just prior to entering the shrink tunnel, i.e. as the mandrel leaves the right-hand end turn, the support roller assembly 212 engages the top surface of guide track 216, FIG. 9, to support the mandrels during the straight run portion at the back of the machine while the mandrels are passed through the shrink tunnel.

SHRINK TUNNEL

The shrink tunnel, FIG. 10, performs three functions during the normal operation of the machine: (a) shrinking the cylindrical sleeve to the side contour of forming member 225, (b) heating the bottom disc 41 preparatory to its being sealed with the inturned end portions of sleeve 40 at the left-hand end turn, and (c) heating the rimming die in ring 330 preparatory to the rimming operation.

During initial start-up of the machine, as discussed above, the main conveyor may be run through the machine for several cycles without feeding web stock so that the forming members 225 may be initially preheated to a temperature in the range of 150° – 180° F. as they pass through the shrink tunnel to facilitate and assure proper shrinkage of the sleeves when normal running commences.

Shrink tunnel 450 includes a longitudinally extending heater 451 disposed at the elevation of the mandrels adjacent the conveyor path. Heater 451 may be of various types depending on the type of material used for the cups, such as infra-red heaters or hot air convective heaters. Heater 451 is mounted to machine base 90 on the outside of the rear straight run portion of the machine by Z-shaped brackets 452 at spaced intervals along its length. Brackets 452 are attached at their upper end to the bottom of heater 451 and at their lower end to base member 90.

To provide for retention of heat and reflection of radiant energy in the shrink tunnel area, an inverted L-shaped housing member 455 is secured to the top of heater 451 and extends across the top and down the opposite side of the mandrel conveyor path to define a generally inverted U-shaped process path through which the main conveyor moves along the back straight run portion of the machine.

As the main conveyor moves the mandrels through the shrink tunnel, the cylindrical sleeve 40 is shrunk to assume the shape of the forming member 225. Since the sleeve 40 extends upwardly above to the upper end of member 225, the upper end of sleeve 40 shrinks inwardly about the end of member 225 to provide an inturned end portion which is fused to the bottom disc 41 during the bottom sealing operation at the left-hand end turn discussed below. As the mandrels are moved through the shrink tunnel, the heat produces an elevated temperature in rimming die 235 in mounting ring 230 so that the end of the sleeve may be subsequently formed into a lip at the left-hand end turn.

As the mandrel 225 moves through the shrink tunnel, the bottom disc within recess 225c is raised upwardly to be exposed to heat from heater 451 and thereby be placed in condition for sealing to the inturned end portion of sleeve 40. As described above, support plate 241 on which the bottom disc is carried is controlled by means of a rod 239 which extends beyond the bottom of support member 211. A longitudinally extending cam 460 is positioned on base member 90 directly below the path of rod 239 in the shrink tunnel area and defines a rising-falling cam surface which controls the movement of rod 239 to raise and lower the disc from the recess. Rod 239 rides on cam 460 due to the weight of the rod and support 241.

The forming mandrels are rotated continuously as they pass through the shrink tunnel. To this end, collar 221 is fixedly positioned on the end of rotatable spindle 219 extending below support member 211. Collar 221 engages the side of a longitudinal rail 461 so that, as each mandrel is conveyed through the shrink tunnel, the mandrel will be rotated by spindle 219. Rail 461 is supported at the elevation of collars 221 by mounting brackets 462 connected at spaced locations along the length of rail 461 to guide track brackets 217. Rail 461 is preferably formed of a resilient material so that resilient contact is maintained with collar 221.

BOTTOM SEALING AND RIMMING TURRET

Immediately after the mandrels leave the shrink tunnel, they are carried around a turret mechanism located at the left-hand end turn of the machine where the bottom disc and inturned sidewall of the shrunken sleeve are sealed together and a rim is formed at the top of the cup. These two operations are performed by a die mechanism 550, FIG. 11, which moves downwardly relative to the mandrels 210. Die mechanism 550, FIG. 13, comprises a central bottom sealing die 560, a sidewall die 570 and an outer die 580. The left-hand end turret mechanism 500 includes a plurality of such die mechanisms 550 mounted at circumferentially spaced positions above the conveyor path by two vertically disposed, spaced turret plates 510 (FIG. 11) which are connected to shaft 501 by a mounting collar 511. To this end, each turret plate 510 is fixedly secured to a horizontal flange 511a of collar 511 by means of bolts 512. In addition to being secured to flanges 511a, turret plates 510 are interconnected by means of a plurality of circumferentially spaced posts 513 which extend vertically between the plates, and which are attached thereto by means of bolts 514. Posts 513, in addition to assuring the proper spacing between turret plates 510, also function as guide members for the die mechanisms as they move vertically and to this end are located on common radii with the die mechanism mounting holes 510a in the turret plates 510.

The die mechanisms 550 are each carried by a cylindrical mounting member 520 which each extend vertically upwardly from its die mechanism through a mounting hole 510a in each of the turret plates 510 to an elevation above the top turret plate. Each mounting member 520 is supported in each turret plate by means of an annular spacer 521 located in mounting hole 510a and a slide bushing 522 which is disposed between collar 521 and member 520 to allow sliding vertical movement therebetween. Vertical movement of the sidewall die 570 and outer die 580 is controlled by a movement of member 520 by a continuous barrel-type cam 530, FIG. 12, extending around the left-hand end turn. A horizontally disposed control plate 531 is fixedly attached to each member 520 at its mid-portion, and a cam follower roller 532 is mounted at the outer end of each plate 531 to track along the cam surface of cam 530. Posts 513 are noncircular in cross section (see FIG. 12), and are embraced by a U-shaped recess at the inner end of plate 531.

Referring to FIG. 13, the sidewall die 570 defines an internal surface which is complementary to the sidewall portion of forming member 225 and is designed to hold the shrunken sleeve 40 in position on the forming member during the bottom sealing and rimming operations, as will be discussed in greater detail below. The upper portion of each die 570 is fixedly secured to a cylindrical mounting member 520 by means of angularly spaced bolts 571 which connect the die to a sleeve 572 that is fixed to the lower end of the mounting member as by welding.

Formed above the contoured working surface of die 570 is an annular frusto-conically shaped recess 573 in which a plurality of layers 574 of micarta material are seated. Recess 573 is diverging in cross section at increased distances from the lower surface 573a thereof, to provide a downwardly diverging inclined camming surface 573b for forcing layers 574 radially outwardly when depressed from above. This affect is used to slidably load the outer die 580 on the mounting ring 230 during the rimming operation. A downward force is provided on layers 574 by a plurality of adjustment bolts 575 mounted in sleeve 572, with the lower end of each bolt engaging a spring loaded plunger 576, which is mounted in a vertical bore 576a in sleeve 572. A compression spring 577 is disposed between each plunger 576 and the uppermost layer of micarta, and by adjusting bolts 575, the radial force generated by layers 574 may be varied.

Outer die 580 consists of a lower die member 581 adapted to be positioned on mounting ring 230 and which defines complementary surfaces to extension 236 of ring 230 and a complementary annular rimming die surface 582 which, together with die 235 forms an essentially circular cavity to form the rim. Die member 581 is attached to a generally cylindrical shaped member 585 at its lower end by any suitable means, such as pins or bolts (not shown). The upper end of cylindrical member 585 is supported on the top surface of sidewall die 570 by means of an annular plate 587 which is attached to the top surface of cylindrical member 585 by means of bolts 588 spaced circumferentially thereabout.

Mounted concentrically with each sidewall die 570, is bottom sealing die 560 which has a downwardly facing surface complementary to horizontal support member 241 on which the bottom forming disc is supported. Each die 560 is supported by means of a cam rod 561 extending vertically upwardly therefrom, with each rod 561 being slidably supported in the center of mounting member 520 by means of bushings 562 located at the ends of member 520. The upper end of rod 560 extends above the top surface of member 520 and is in contact with a control cam 565 which extends around approximately 190° of the left-hand end turn.

When the mandrels leave the shrink tunnel and enter the left-hand end turn, the mandrels are supported on a horizontal support plate 585 fixed on shaft 501 vertically above sprocket 502. Plate 585 is connected to the top surface of collar 507 and spaced from sprocket 502 by a plurality of mounting blocks 586 located at spaced intervals around the circumference of plate 585. The upper surface of support plate 585 is designed to engage and support the lower surface of horizontal support 218 of the mandrel and thereby support the mandrel 210 during the rimming and bottom sealing operations.

It will be appreciated that vertical registry between the mandrels 210 and the die mechanisms 550 is important for the rimming and bottom sealing operations, and to this end, a plurality of centering mechanisms 590 (one for each mandrel) are provided at angular intervals around support plate 585. Each centering mechanism comprises a cam controlled finger 591 which is radially slidable in a housing 592. The outer leading edge of finger 591 is designed to bear against the horizontal support 218 to align the centerline of the mandrel with the centerline of the die mechanism 550 and thus accommodate for any relative displacement due to the chain carried mandrels as they move in sprockets 502 and 503. Each housing 592 is suitably mounted on plate 585, as by bolts or welding, and fingers 591 are biased radially inwardly by spring 593 to force a roller 594 at the other end of each finger 591 against a fixedly positioned cam 595.

Cam 595 is connected to the machine frame by means of an L-shaped bracket 596 (FIG. 12) which extends longitudinally outwardly and encompasses shaft 501 which is freely rotatable therein. Cam 595 is attached to bracket 596 by a plurality of bolts 597 and spacers 598, and is designed to force the centering member 591 radially outwardly and into engagement with the horizontal support plate 218 just as a mandrel enters the arcuate path at the left-hand end turn and before lowering of die mechanisms 550 has been completed. Centering is accomplished by aligning the trailing surface of support plate 218 with the leading portion of finger 591. The centering finger 591 stays in contact with the mandrel until the lowering of die mechanism 550 has been completed, and in the illustrated embodiment, when the mandrel crosses the longitudinal median of the machine, the cam surface decreases in radius to retract the centering device from the mandrel. As will be discussed in greater detail below, the die mechanisms 550 are lowered into engagement with the mandrel during the first 90° of rotation at the left-hand end turn as can be seen from the cam profiles in FIG. 12, so that the centering device need not be in contact after the 90° position has been passed.

Referring now to FIGS. 12–17, the operation of the die mechanisms is as follows: As each mandrel is conveyed to the left-hand end turn, the horizontal support 241 on which the disc 41 is carried is maintained at an elevated position by a rise portion in cam 460 and the bottom sealing die 560 is cammed downwardly by a rapid rise portion 565a (FIG. 12) of cam 565 so that the disc and inturned portion of the shrunken sleeve are compressed and a liquid-tight seal is formed therebetween, FIG. 13.

Support member 520 is then cammed downwardly by cam 530 to cause the sidewall die 570 to be brought into engagement with the shrunken sleeve 41 on forming member 235 to hold the sleeve thereon during the rimming operation, FIG. 14. As support 520 continues to move downwardly, rimming die 581 seats on ring 230 to form a rimming cavity between dies 582 and 235. Member 520 continues to move downwardly causing the sidewall die 570 to move downwardly relative to outer die 580 to cause the lip of the container to be forced into the previously heated die 235 to produce a rim or lip on the container, FIG. 15. After the rim has been formed in the container, support member 241 is lowered by a drop portion 460a (FIG. 12) in cam 460 and the rimming mechanism 550 is raised upwardly by member 520 due to a rise portion in cam 530. As the rimming mechanism is raised upwardly to its extreme position, the top of flange 587 engages a downwardly-extending reset member 510b in plate 510 which causes the outer die 580 to be reset relative to the sidewall die 570, FIG. 16, so that the die mechanism is ready for another cycle.

As a mandrel 210 approaches the front straight run portion of the machine, support 241 is cammed upwardly, FIG. 17, by a rapid rise portion 460b (FIG. 12) in cam 460 to cause the finished container 42 to be lifted out of engagement with forming member 235, and the finished container is removed from the mandrel by a pneumatic tube 600 (FIGS. 1 and 1A) for further processing, such as packaging in groups for ultimate consumer use.

Bushings 562 allow rod 561 to slide therein under the influence of cam 565, but the functional engagement between bushing 562 and rod 561 is sufficient so that rod 561 moves upwardly with support member 520 and is reset by cam 565. As the die mechanisms move out of engagement with each mandrel, at the beginning of the front straight run portion of the machine, the mandrel support 211 is supported by roller 213 on guide track 216 along the front run portion of the machine, and the mandrels move beneath the bottom punch mechanism 250 where they receive a bottom disc, and the entire cycle is repeated.

We claim:

1. The method of forming a sheet of thermoplastic material into a sleeve comprising the steps of: providing a continuous supply of thermoplastic sheet stock material; feeding said material along a processing path; severing said material into individual sheets having a leading end and a trailing end; serially introducing the leading end of each sheet into a hollow cylindrically shaped support; directing the sheet around the interior of said cylindrically shaped support perpendicular to the axis of said support and along an arc concentric with the axis thereof to form said sheet into a generally tubular shape with the trailing end portion overlapping the leading end portion and with surfaces on said trailing and leading end portions facing one another; moving each tubular sheet axially relative to said support; directing air from a heating means toward the facing surfaces of said overlapping trailing and leading end portions as said sheet is moved past said heating means, whereby said air softens said facing surfaces; and forming a liquid-tight seam between said end portions by pressing said overlapping trailing end portion and said leading end portion against one another to form a sleeve as said sheet is moved axially.

2. The method according to claim 1 wherein the sheet introducing step is performed by feeding the sheet between the nip of two rotatable rollers; and driving one of said rollers to pull the sheet into the interior of said cylindrical support.

3. The method according to claim 1 wherein the sheet directing step is performed by winding said sheet about an arbor positioned in the interior of said cylindrical support.

4. The method according to claim 1 wherein said air directing step is performed by forcing heated air through a nozzle.

5. The method according to claim 1 wherein said air directing step is performed by directing air between the end portions of said sheet whereby said air softens the facing surfaces thereof.

6. The method according to claim 1 wherein said pressing step is performed by moving said end portions between the nip of two rotatable rollers; and driving one of said rollers to pull the sheet between said rollers.

7. The method according to claim 1 wherein the step of pressing said end portions is performed by continuously rotating a first roller having a concave working surface, said roller contacting the exterior of said tubular sheet, and positioning a second roller having a convex working surface generally complementary with the concave working surface of said first roller within said tubular sheet and aligned with said first roller, whereby said rollers press said softened facing surfaces to form said seam.

8. The method of forming a plurality of sleeves from a continuous web of thermoplastic material comprising the steps of: feeding said web to a blank forming station; severing said web at said blank forming station to form blanks of predetermined length; serially winding said blanks around a guide into generally tubular shaped members with the trailing end portion overlapping the leading end portion at a winding station, at least a portion of the external surface of said guide being cylindrical in shape, said winding step being performed by moving the leading end of each sheet in a direction perpendicular to the axis of said guide and along an arc concentric with the axis thereof; moving each said tubular shaped member toward a further working station while directing hot air from a heating means toward said overlapping end portions, whereby said hot air softens said end portions; pressing said trailing end portion against said leading end portion to form a liquid-tight seam between said end portions and thereby form a sleeve; positioning a pickup head adjacent said sleeve as it moves toward said further working station; supplying a vacuum to said pickup head to affix said sleeves thereto; moving upwardly facing forming mandrels having a major diameter less than the inner diameter of said sleeves along a process path at said farther working station; moving said pickup heads into a position adjacent said mandrel process path in timed relationship with the movement of said mandrels, whereby said sleeves are positioned about said mandrels; and releasing said sleeves from said pickup heads.

9. The method according to claim 8 wherein said web feeding step is performed by continuously rotating a roller having a circumferentially discontinuous web engaging surface.

10. The method according to claim 8 wherein said web is severed by reciprocating a cutter blade through said web.

11. The method according to claim 8 wherein said winding station is elevated from and transversely disposed relative to said mandrel process path, said sleeves being wound with their longitudinal axis perpendicular to said mandrel process path.

12. The method according to claim 11 wherein said pickup head moving step is performed by rotating said pickup head, whereby said sleeves are rotated to an upright orientation and deposited about said mandrels.

13. The method of forming a sheet of thermoplastic material into a sleeve comprising the steps of: providing a continuous supply of thermoplastic sheet stock material of uniform width; feeding said material along a processing path; severing said material into individual sheets having a leading end and a trailing end; serially wrapping each sheet around a guide member and into a generally tubular shape, with the trailing end portion overlapping the leading end portion adjacent a heating means and with surfaces on said trailing and leading end portions facing one another, at least a portion of the external surface of said guide member being cylindrical in shape, said wrapping step being performed by moving the leading end of each sheet in a direction perpendicular to the axis of said guide member and along an arc concentric with the axis thereof; directing air from said heating means toward the facing surfaces of said overlapping trailing and leading end portions, whereby said air softens said facing surfaces; and pressing said overlapping trailing end portion and said leading end portion against one another to form a seam between said end portions and thereby form a sleeve.

14. The method according to claim 13 wherein said wrapping step is performed by introducing the leading end of each sheet into a hollow generally cylindrically shaped support concentric with the axis of said guide member, and directing each sheet around the interior of said support and the exterior of said guide member.

15. The method according to claim 13 including the further step of moving each tubular sheet axially relative to said support and said heating means as heated air is directed against the facing surfaces of said overlapping trailing and leading end portions, and performing said pressing step as each tubular sheet is moved axially.

16. The method according to claim 13 wherein said wrapping step is performed by continuously rotating a roller having a circumferentially discontinuous sheet engaging surface.

17. The method according to claim 16 wherein said wrapping step is performed by rotating two similar rollers having circumferentially discontinuous sheet advancing surfaces.

18. The method according to claim 16 further comprising positively braking the feeding of said sheet when said sheet engaging surface is out of engagement with said web.

19. The method according to claim 13 wherein said sheet stock material is severed by reciprocating a cutter blade through said material.

* * * * *